United States Patent
Yokota et al.

(10) Patent No.: US 6,263,905 B1
(45) Date of Patent: Jul. 24, 2001

(54) AUTOMATIC REGULATING VALVE APPARATUS

(75) Inventors: Hiroshi Yokota; Shingo Yokota, both of Hiroshima (JP)

(73) Assignee: Kabushiki Kaisha Yokota Seisakusho, Hiroshima-Ken (JP)

( * ) Notice: Subject to any disclaimer, the term of this patent is extended or adjusted under 35 U.S.C. 154(b) by 0 days.

(21) Appl. No.: 09/284,057

(22) PCT Filed: Oct. 2, 1997

(86) PCT No.: PCT/JP97/03539

§ 371 Date: Apr. 6, 1999

§ 102(e) Date: Apr. 6, 1999

(87) PCT Pub. No.: WO98/15762

PCT Pub. Date: Apr. 16, 1998

(30) Foreign Application Priority Data

Oct. 8, 1996 (JP) .................................................. 8-267617

(51) Int. Cl.⁷ ........................... F16K 31/34; F16K 31/124
(52) U.S. Cl. ........................... 137/413; 137/423; 137/492; 137/501
(58) Field of Search ........................... 137/485, 486, 137/487, 488, 492, 501, 413, 414, 423

(56) References Cited

U.S. PATENT DOCUMENTS

| | | | | |
|---|---|---|---|---|
| 1,904,475 | * | 4/1933 | Kissing | 137/501 X |
| 1,934,713 | * | 11/1933 | Hughes | 137/501 X |
| 1,962,676 | * | 6/1934 | Albright | 137/501 X |
| 2,149,390 | * | 3/1939 | Donaldson Jr. | 137/501 X |
| 2,574,823 | * | 11/1951 | Fulkerson | 137/501 X |

(List continued on next page.)

FOREIGN PATENT DOCUMENTS

| | | |
|---|---|---|
| 61-116875 | 7/1986 | (JP) . |
| 2-46818 | 10/1990 | (JP) . |
| 4-102780 | 4/1992 | (JP) . |

Primary Examiner—John Rivell
(74) Attorney, Agent, or Firm—Ladas & Parry

(57) ABSTRACT

An automatic regulating valve apparatus comprises a main valve unit, and a pilot valve unit operatively connected to the main valve unit to control the main valve unit. The main valve unit comprises a main valve casing, a main valve element disposed in the main valve casing, and a main valve driving member disposed in the main valve casing together with the main valve element and having a pressure receiving area greater than that of the main valve element, the main valve element is disposed on the upstream side of a valve seat so as to form a restricting passage between the main valve element and the main valve seat, and the main valve driving member is disposed for sliding movement in a space defined by a cylindrical wall formed in the main valve casing so as to define a main valve driving pressure chamber together with the cylindrical wall. The pilot valve unit comprises pilot valves A and B which are operated for opening and closing operations according to the variation of a pressure difference across an orifice included in the main valve unit, a pressure difference across the main valve unit, liquid level on the downstream side of the main valve unit or the pressure on the upstream side of the main valve unit. The pilot valve A and the pilot valve B are arranged in series and connected between the upstream and the downstream side of the main valve unit by connecting passages with a chamber between the pilot valves A and B connected to the main valve driving pressure chamber. The pressure in the main valve driving pressure chamber is varied by the coordinated operations of the pilot valves A and B to regulate the opening of the main valve unit. Thus, the automatic regulating valve apparatus 4 exercises automatic control functions including a constant-flow control function, an emergency shutoff function, a liquid level control function and an upstream pressure control function.

7 Claims, 24 Drawing Sheets

U.S. PATENT DOCUMENTS

| | | | |
|---|---|---|---|
| 2,741,261 | * | 4/1956 | Weissenborn ................... 137/501 X |
| 2,837,241 | * | 6/1958 | Griswold ......................... 137/501 X |
| 3,023,591 | * | 3/1962 | Tilney .............................. 137/501 X |
| 4,095,614 | * | 6/1978 | Marmon ............................... 137/414 |
| 4,291,544 | * | 9/1981 | Larsen ............................ 137/413 X |
| 4,830,042 | * | 5/1989 | Cho .................................. 137/431 X |
| 4,967,789 | * | 11/1990 | Kypris ................................. 137/413 |
| 5,642,752 | * | 7/1997 | Yokota et al. .................. 137/501 X |
| 5,735,308 | | 4/1998 | Yokota et al. . |

\* cited by examiner (MAIN VALVE UNIT)

AUTOMATIC REGULATING VALVE APPARATUS

TECHNICAL FIELD

The present invention relates to an automatic regulating valve apparatus to be installed in a fluid conducting line. More specifically, the present invention relates to an automatic regulating valve apparatus with a pilot valve unit based on a novel technical idea, capable of being easily formed in large size or high-pressure type, and of exercising excellent automatic control functions including a constant-flow control function, an emergency shutoff function, a liquid level control function and an upstream pressure control function, having a perfect sealing function and a clogging preventing function achieved by a self-cleaning operation, and convenient for application.

In this description, the terms "water" and "liquid" are used as general designations of fluids.

BACKGROUND ART

Various kinds of automatic regulating valve devices have been proposed. A lift valve apparatus disclosed in JP-B No. 2-46818 is a direct-acting constant-flow valve not provided with any pilot valve.

As shown in FIG. 23, this prior art lift valve apparatus has a valve casing 101 having an internal space divided into three passages, i.e., an inlet passage a an intermediate chamber u and an outlet passage c arranged in that order from an upstream side toward the downstream side, by a flow rate setting valve element 103 and an automatic restriction control valve element 104. The respective pressure receiving areas of the valve element 103 and the automatic valve element 104 are substantially equal. A sealed chamber e defined by a sealing member 104s attached to the automatic valve element 104, and a valve top 102 is connected to the inlet passage a by a connecting passage t. The automatic valve element 104 is biased for automatic restriction control function by a balancing spring 105. The automatic valve element 104 moves automatically in opposite directions according to the position of the valve element 103 corresponding to a set opening to maintain a constant flow rate.

This direct-acting constant-flow valve is used prevalently. However, the direct-acting constant-flow valve has unsolved problems in forming the same in large size and high-pressure type. The size of the balancing spring 105 increases inevitably as the size and the pressure capacity of the direct-acting constant-flow valve are increased, entailing difficulties in assembling, designing and manufacturing the direct-acting constant-flow valve. It is not easy to select a balancing spring 105 capable of properly controlling flow rate in a conduit in which pressure varies frequently.

Pilot-operated automatic regulating valve apparatuss provided with a main valve driving piston or diaphragm operated by a pilot valve, which adjusts flow rate with a fixed restriction passage such as a needle valve, are also used prevalently instead of the direct-acting constant-flow valve. A liquid level control valve provided with a float valve as a pilot is one of those valve apparatuses.

Referring to FIG. 24, this liquid level regulating or control valve apparatus has a main valve unit controlled by the opening and closing actions of a piloting float valve 230. The main valve unit has a main valve casing 201, a main valve element 205 disposed in the main valve casing 201, and a main valve driving member 206 having a pressure receiving area greater than that of the main valve element 205 and combined with the main valve element 205. A restricted passage is formed between the main valve element 205 and a main valve seat 204. The main valve driving member 206 is fitted slidably in a space defined by a cylindrical wall 203 formed inside the main valve casing to form a main valve driving pressure chamber d between the cylindrical wall 203 and a valve top 202. The float valve 230 closes when the liquid level on the downstream side of the main valve unit rises above a predetermined level and opens when the same drops below the predetermined level. The main valve driving pressure chamber d is connected to an inlet passage in an upstream end of the main valve unit by a connecting passage t provided with a fixed restricting valve 220 and is connected through the float valve 230 to the downstream side of the main valve unit. The pressure in the main valve driving pressure chamber d drops to the pressure in a passage on the downstream side of the main valve unit when the float valve 230 opens, and the main valve element 205 is moved in a valve opening direction to start supplying the liquid. In the meantime, the float valve 230 closes when the liquid level on the downstream side of the main valve unit rises above the predetermined level, the pressure in the main valve driving pressure chamber d rises to the pressure on the upstream side of the main valve unit, and the main valve element 205 is moved so that a sealing member 205s comes into close contact with the main valve seat 204 to stop supplying the liquid.

This prior art pilot-operated automatic regulating valve apparatus, however, needs troublesome maintenance and management work and has many problems in durability. The following are examples of those problems.

(1) Most of various sealing means for use as a sealing member 206s put on the main valve driving member 206 in contact with the cylindrical wall 203 are required to achieve perfect sealing not permitting leakage when the main valve unit is closed, and a bellows and a diaphragm have been employed as the sealing member 206s to solve the problem. When the pilot-operated automatic regulating valve apparatus is of a large size and a large pressure capacity, difficulties arise in the durability and machining accuracy of the sealing arrangement, and troublesome maintenance and management work is necessary; that is, the fluid is liable to leak downstream.

(2) The main valve unit must gradually be driven to prevent undesirable operations, such as chattering and hunting, due to pressure pulsation resulting from the change of flow. Therefore, the prior art pilot-operated automatic regulating valve apparatus needs the fixed restricting valve 220 forming a restricted passage, such as a needle valve, in the connecting passage t through which the fluid of the upstream pressure flows. This small restricted passage is clogged with sand and dust to cause troubles and hence a strainer or the like is necessary. Thus, it is difficult to use this prior art pilot-operated automatic regulating valve apparatus in fluid passages other than a fluid passage for a clean liquid.

The present invention employs a pilot valve unit based on a novel technical idea to realize a valve capable of being formed in a large size and a large pressure capacity, which could not have been realized by the prior art direct-acting constant-flow valve. Also, it is an object of the present invention to provide a pilot-operated automatic regulating valve apparatus capable of exercising excellent automatic control functions including a constant-flow control function, an emergency shutoff function, a liquid level control function and an upstream pressure control function, having a perfect sealing function, provided with a pilot valve unit not having any fixed restricting passage, such as a needle valve, and capable of exercising a clogging preventing function achieved by self-cleaning operation, capable of operating quickly without entailing chattering and hunting, and convenient for application.

DISCLOSURE OF THE INVENTION

With the foregoing object in view, the present invention provides an automatic regulating valve apparatus comprising a main valve unit and a pilot valve unit operatively connected to the main valve unit to control the main valve unit, wherein the main valve unit comprises a main valve casing, a main valve element disposed in the main valve casing, and a main valve driving member disposed in the main valve casing together with the main valve element and having a pressure receiving area greater than that of the main valve element, the main valve element is disposed on an upstream side of a valve seat so as to form a restricting passage between the main valve element and the main valve seat, the main valve driving member is disposed for sliding movement in a space defined by a cylindrical wall formed in the main valve casing so as to define a main valve driving pressure chamber together with the cylindrical wall, a restrictor is disposed in a passage extending through the main valve unit, the pilot valve unit comprises a pilot valve A and a pilot valve B which are operated by a balance of counteracting forces respectively produced by pressure difference across the restrictor and a fixed-pressure applying means, the pilot valve A opens when the pressure difference across the restrictor rises above a predetermined level and closes when the same drops below the predetermined level, the pilot valve B closes when the pressure difference across the restrictor rises above the predetermined level and opens when the same drops below the predetermined level, and the pilot valve A and the pilot valve B are arranged in series and connected between the upstream and the downstream side of the main valve unit by connecting passages with a chamber between the pilot valves A and B connected to the main valve driving pressure chamber.

The restrictor may be of a variable type.

The automatic regulating valve apparatus may further comprise a valve means placed in series in a connecting passage connected to the pilot valve B to open and close the connecting passage.

The automatic regulating valve apparatus may further comprise a valve means placed in series in the connecting passage connected to the pilot valve B to close the connecting passage when an abnormal condition detecting means detects an abnormal condition.

The automatic regulating valve apparatus may further comprise a valve means capable of closing when liquid level on the downstream side of the main valve unit rises above a predetermined level and of opening when the same drops below the predetermined level, and placed in series in a connecting passage connected to the pilot valve B.

The automatic regulating valve apparatus may further comprise a valve means capable of closing when the liquid level on the downstream side of the main valve unit rises above a predetermined upper limit and of opening when the same falls below a predetermined lower limit, and placed in series in the connecting passage connected to the pilot valve B.

The automatic regulating valve apparatus may further comprise a pilot valve C operated by a balance of counteracting forces respectively produced by pressure difference across the main valve unit and a fixed-pressure applying means, capable of closing when the pressure difference across the main valve unit rises above a predetermined level and of opening when the same drops below the predetermined level, a first float valve capable of closing when liquid level on the downstream side of the main valve unit rises above a predetermined upper limit and of opening when the same drops below the predetermined upper limit, and a second float valve capable of closing when the liquid level on the downstream side of the main valve unit rises above a predetermined lower limit and of opening when the same drops below the lower limit, wherein the pilot valve C and the first float valve may be placed in series in a connecting passage connected to the pilot valve B, and the main valve driving pressure chamber may be connected through the second float valve to the downstream side of the main valve unit.

The automatic regulating valve apparatus may further comprise a pilot valve D operated by a balance of counteracting forces respectively produced by a pressure difference across the restrictor and a fixed-pressure applying means, capable of opening when the pressure difference across the restrictor rises above a predetermined level and of closing when the same drops below the predetermined level, a first float valve capable of closing when liquid level on the downstream side of the main valve unit rises above a predetermined upper limit and of opening when the same drops below the predetermined upper limit, and a second float valve capable of closing when the liquid level on the downstream side of the main valve unit rises above a predetermined lower limit and of opening when the same drops below the lower limit, wherein the pilot valve D and the first float valve may be placed in series in a connecting passage connected to the pilot valve B, and the main valve driving pressure chamber may be connected through the second float valve to the downstream side of the main valve unit.

Three valve elements of the pilot valves A, B and D may be disposed coaxially so as to move together according to the balance of the counteracting forces produced by the pressure difference across the restrictor and the fixed-pressure applying means.

The present invention provides an automatic regulating valve apparatus comprising a main valve unit and a pilot valve unit operatively connected to the main valve unit to control the main valve unit, wherein the main valve unit comprises a main valve casing, a main valve element disposed in the main valve casing, and a main valve driving member disposed in the main valve casing together with the main valve element and having a pressure receiving area greater than that of the main valve element, the main valve element is disposed on an upstream side of a valve seat so as to form a restricting passage between the main valve element and the main valve seat, the main valve driving member is disposed for sliding movement in a space defined by a cylindrical wall formed in the main valve casing so as to define a main valve driving pressure chamber together with the cylindrical wall, the pilot valve unit comprises a pilot valve A and a pilot valve B operated by a balance of counteracting forces respectively produced by a pressure difference across the main valve unit and a fixed-pressure applying means, the pilot valve A is capable of opening when the pressure difference across the main valve unit rises above a predetermined level and of closing when the same drops below the predetermined level, the pilot valve B is capable of closing when the pressure difference across the main valve unit rises above the predetermined level and of opening when the same drops below the predetermined level, the pilot valves A and B are arranged in series and connected between the upstream and the downstream side of the main valve unit by connecting passages with a chamber between the pilot valves A and B connected to the main valve driving pressure chamber, a first float valve capable of closing when liquid level on a downstream side of the main valve unit rises above a predetermined upper limit and of opening when the same drops below the predetermined upper limit and a second float valve capable of closing when the liquid level on the downstream side of the main valve unit rises above a predetermined lower limit and of opening when the same drops below the lower limit are employed, the first float valve is placed in series in a connecting passage connected to the pilot valve B, and the main valve driving pressure chamber is connected through the second float valve to the downstream side of the main valve unit.

The present invention provides an automatic regulating valve apparatus comprising a main valve unit and a pilot valve unit operatively connected to the main valve unit to control the main valve unit, wherein the main valve unit comprises a main valve casing, a main valve element disposed in the main valve casing, and a main valve driving member disposed in the main valve casing together with the main valve element and having a pressure receiving area greater than that of the main valve element, the main valve element is disposed on an upstream side of a valve seat so as to form a restricting passage between the main valve element and the main valve seat, the main valve driving member is disposed for sliding movement in a space defined by a cylindrical wall formed in the main valve casing so as to define a main valve driving pressure chamber together with the cylindrical wall, the pilot valve unit comprises a pilot valve A and a pilot valve B which are operatively connected to a float which moves vertically according to the variation of liquid level on a downstream side of the main valve unit, the pilot valve A opens when the float rises and closes when the float falls, the pilot valve B closes when the float rises and opens when the float falls, and the pilot valves A and B are arranged in series and connected between the upstream and the downstream side of the main valve unit by connecting passages with a chamber between the pilot valves A and B connected to the main valve driving pressure chamber.

The present invention provides an automatic regulating valve apparatus comprising a main valve unit and a pilot valve unit operatively connected to the main valve unit to control the main valve unit, wherein the main valve unit comprises a main valve casing, a main valve element disposed in the main valve casing, and a main valve driving member disposed in the main valve casing together with the main valve element and having a pressure receiving area greater than that of the main valve element, the main valve element is disposed on an upstream side of a valve seat so as to form a restricting passage between the main valve element and the main valve seat, the main valve driving member is disposed for sliding movement in a space defined by a cylindrical wall formed in the main valve casing so as to define a main valve driving pressure chamber together with the cylindrical wall, the pilot valve unit comprises a pilot valve A and a pilot valve B which are operated by a balance of counteracting forces respectively produced by pressure difference across the main valve unit and a fixed-pressure applying means, the pilot valve A opens when the pressure difference across the main valve unit rises above a predetermined level and closes when the same drops below the predetermined level, the pilot valve B closes when the pressure difference across the main valve unit rises above the predetermined level and opens when the same drops below the predetermined level, the pilot valve A and the pilot valve B are arranged in series and connected between the upstream and the downstream side of the main valve unit by connecting passages with a chamber between the pilot valves A and B connected to the main valve driving pressure chamber.

The present invention provides an automatic regulating valve apparatus comprising a main valve unit and a pilot valve unit operatively connected to the main valve unit to control the main valve unit, wherein the main valve unit comprises a main valve casing, a main valve element disposed in the main valve casing, and a main valve driving member disposed in the main valve casing together with the main valve element and having a pressure receiving area greater than that of the main valve element, the main valve element is disposed on an upstream side of a valve seat so as to form a restricting passage between the main valve element and the main valve seat, the main valve driving member is disposed for sliding movement in a space defined by a cylindrical wall formed in the main valve casing so as to define a main valve driving pressure chamber together with the cylindrical wall, the pilot valve unit comprises a pilot valve A and a pilot valve B which are operated by a balance of counteracting forces respectively produced by pressure on the upstream side of the main valve unit and a fixed-pressure applying means, the pilot valve A closes when the pressure on the upstream side of the main valve unit rises above a predetermined level and opens when the same drops below the predetermined level, the pilot valve B opens when the pressure on the upstream side of the main valve unit rises above the predetermined level and closes when the same drops below the predetermined level, the pilot valves A and B are arranged in series and connected between the upstream and the downstream side of the main valve unit by connecting passages with a chamber between the pilot valves A and B connected to the main valve driving pressure chamber.

According to the present invention, the cylindrical wall of the main valve casing may have a cylindrical part and a reduced cylindrical part coaxial with the cylindrical part, the main valve driving member may be provided on its peripheral part with a piston part and an expanded piston part coaxial with the piston part, the expanded piston part may come into sliding contact with the cylindrical part and the piston part may come into sliding contact with the reduced cylindrical part when the main valve driving member moves in a predetermined section of a range of movement of the main valve driving member to form a damping chamber for dampening the movement of the main valve driving member.

The automatic regulating valve apparatus may be contained in a case provided with connecting openings to be connected to external conduits.

In the automatic regulating valve apparatus thus constructed in accordance with the present invention, the pressure in the main valve driving pressure chamber is varied properly by the coordinated operations of the pilot valves A and B which opens and closes according to the variation of the pressure difference across the restrictor, the pressure difference across the main valve unit, the liquid level on the downstream side of the main valve unit or the pressure on an upstream side of the main valve unit to adjust the position of the main valve element relative to the main valve seat for the automatic control of the fluid flowing through the automatic-control valve to achieve excellent automatic control functions including a constant-flow control function, an emergency shutoff function, a liquid level control function and an upstream pressure control function. The automatic-control valve is capable of readily achieving perfectly sealed shut-off.

Since both the pilot valves A and B are not provided with any fixed restricting passage, such as a needle valve, the pilot valves A and B are not easily clogged with sand or dust. If, by any chance, the pilot valves A and B should be clogged, the pilot valves A and B open in response to pressure change resulting from clogging to exercise a clogging preventing function achieved by a self-cleaning operation.

The pilot valves A and B operate coordinately to combine the pressure on the upstream side of the main valve unit and the pressure on the downstream side of the main valve unit in the pilot valve unit, and the combined pressure is applied to the main valve driving pressure chamber to respond quickly to the variation of the flowing mode of the fluid. Thus, the automatic-control valve is capable of operating quickly without entailing chattering and hunting.

BEST MODE FOR CARRYING OUT THE INVENTION

Figure 1:
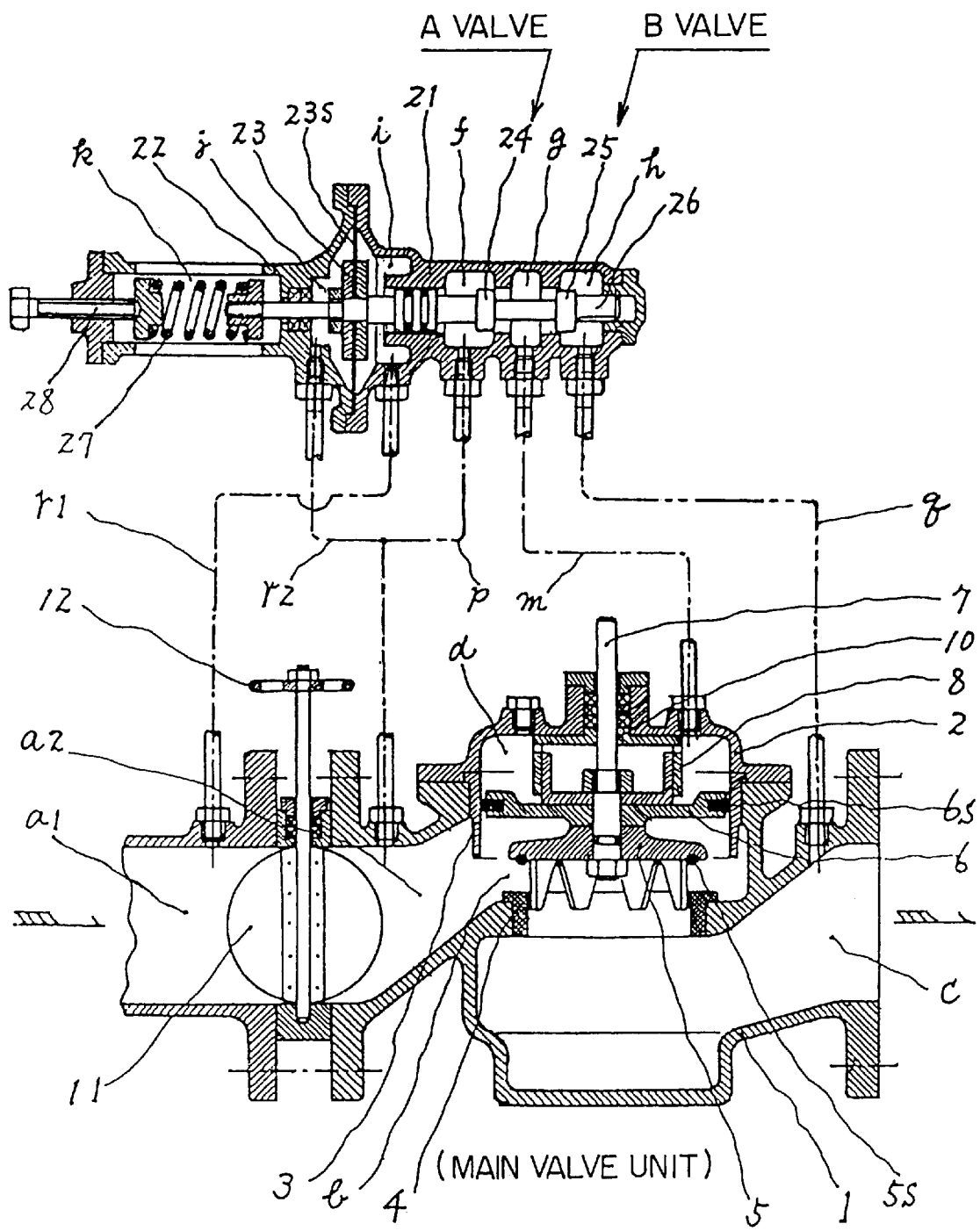
FIG. 1 is a longitudinal sectional view of an automatic regulating valve apparatus in a first embodiment of the present invention most closely relating to an automatic regulating valve apparatus stated in claims 1 and 2.

The present invention will be described in detail with reference to the accompanying drawings.

In the following description, a pilot valve A and a valve element included in the pilot valve A will be referred to as "A valve" and "A valve element", respectively, a pilot valve B and a valve element included in the pilot valve B will be referred to as "B valve" and "B valve element", respectively, a pilot valve C and a valve element included in the pilot valve C will be referred to as "C valve" and "C valve element", respectively, a pilot valve D and a valve element included in the pilot valve D will be referred to as "D valve" and "D valve element", respectively, a passage on the upstream side of a main valve unit will be referred to as "upstream passage", pressure in the upstream passage is referred to as "primary pressure", a passage on the downstream side of the main valve unit will be referred to as "downstream passage" and pressure in the downstream passage will be referred to as "secondary pressure" for convenience' sake. Parts capable of the same functions are designated by the same reference characters throughout the drawings.

A first embodiment of the present invention will be described with reference to FIG. 1. An automatic regulating valve apparatus in the first embodiment is a constant-flow valve apparatus.

Referring to FIG. 1, a main valve unit has a main valve casing 1 having an inlet passage a (a1 and a2) and an outlet passage c, a main valve top 2 and a main valve seat 4. Arranged in the main valve casing 1 are a main valve element 5 disposed on the upstream side of the main valve seat 4, a main valve driving member 6 fitted for sliding movement in a space defined by a cylindrical wall 3 formed in the main valve casing 1 and provided with a sealing member 6s for making a sealed joint, which may be a loose sealed joint capable of preventing only natural leakage, between the main valve driving member 6 and the cylindrical wall 3, and a main valve stem 7. The main valve element 5 and the main valve driving member 6 are held in combination on the main valve stem 7. The main valve stem 7 is supported for axial movement in a bearing 10. A closed main valve driving pressure chamber d is defined by the main valve driving member 6, the cylindrical wall 3 and the main valve top 2. The pressure in the main valve driving pressure chamber d is controlled to control the main valve element 5 for opening and closing a main valve opening b formed between the main valve element 5 and the main valve seat 4. The pressure receiving area of the main valve driving member 6 is somewhat greater than that of the main valve element 5.

A restrictor 11 is disposed in a passage extending through the main valve unit. In this embodiment, the restrictor 11 is of a movable type capable of being operated for flow control by operating a handwheel 12.

Pressure difference across the restrictor 11 varies according to the variation of flow rate. An A valve opens when the pressure difference across the restrictor 11 rises beyond a predetermined level and closes when the same drops below the predetermined level. A B valve closes when the pressure difference across the restrictor 11 rises beyond the predetermined level and opens when the same drops below the predetermined level. The pilot valve A and the pilot valve B are arranged in series and connected between the upstream and the downstream side of the main valve unit by connecting passages with a chamber between the A valve and the B valve connected to the main valve driving pressure chamber d. Thus, the main valve driving pressure chamber d serves as an operating pressure chamber for driving the main valve unit.

As shown in FIG. 1, the pilot valve unit has a valve casing 21 and a valve top 22. The valve casing 21 has an A valve chamber f for the A valve, a B valve chamber h for the B valve, an intermediate chamber g formed between the A valve and the B valve, and an ante-restrictor pressure chamber i. An A valve element 24 is fitted in the A valve chamber f, a B valve element 25 is fitted in the B valve chamber h, and the intermediate chamber g is formed between the A valve chamber f and the B valve chamber h. The A valve element 24 and the B valve element 25 are coaxial lands formed on a spool, and form a cylinder-piston valve opening/closing mechanism so as not to interfere with each other. The distance between the A valve element 24 and the B valve element 25 are determined so as to create a state where one of the A valve and the B valve is open and the other is closed and a state where both the A valve and the B valve are substantially closed. Indicated at 23 is a pressure receiving plate, at 23s is a sealing member, at 26 is a spool for combining the valve elements 24 and 25 with the pressure receiving plate 23. A post-restrictor pressure chamber j and a spring chamber k are formed in the valve top 22. A spring 27 (a compression coil spring in this embodiment), i.e., fixed-pressure applying means, is contained in the spring chamber k. The spring chamber k may be formed in a sealed chamber to use the same as the post-restrictor pressure chamber j.

Both the valve elements 24 and 25 need not be capable of tight sealing for valve closing operation and may allow slight leakage. Needless to say, the valve elements 24 and 25 may be capable of tight sealing.

The ante-restrictor pressure chamber i is connected to the passage a1 on the upstream side of the restrictor 11 by a connecting passage r1, and the post-restrictor pressure chamber j is connected to the passage a2 on the downstream side of the restrictor 11 by a connecting passage r2. The A valve chamber f is connected to the passage a2 by a connecting passage p to apply a primary pressure, i.e., pressure in the passage a2, to the same, the intermediate chamber g is connected to the main valve driving pressure chamber d by a connecting passage m, and the B valve chamber h is connected to the outlet passage c by a connecting passage q to apply a secondary pressure to the same.

The operation of the present invention will be described with reference to FIG. 1 showing the first embodiment. In FIG. 1, the arrows indicates the flowing direction of a fluid.

When the restrictor 11 is fully open, an opening defined by the restrictor 11 provides only a slight resistance. In this state, the force of the spring 27 exceeds a force produced by the pressure difference between the ante-restrictor pressure chamber i and the post-restrictor pressure chamber j, i.e., the pressure difference across the restrictor 11 and hence the pressure receiving plate 23 is pressed in the direction of extension of the spring 27. Consequently, the A valve element 24 is at a closing position to close the A valve, the B valve element 25 is at an opening position to open the B valve, and hence the secondary pressure prevails in the main valve driving pressure chamber d. Therefore, the main valve element 5 is moved away from the main valve seat 4 by a force corresponding to the difference between the respective pressure receiving areas of the main valve element 5 and the main valve driving member 6, and the fluid flows through the inlet passages a1 and a2→a main valve opening b→the outlet passage c.

Needless to say, the spring 27 is designed so that the same is able to exert forces capable of counterbalancing the pressure differences across the restrictor 11.

When the opening defined by the restrictor 11 is reduced to regulate the flow of the fluid, resistance exerted on the fluid by the opening increases. Then, in the pilot valve unit, the force corresponding to the pressure difference between the ante-restrictor pressure chamber i and the post-restrictor pressure chamber j, i.e., the pressure difference across the restrictor 11, exceeds the force of the spring 27, and the pressure receiving plate 23 is pressed in a direction to compress the spring 27. Consequently, the A valve element 24 moves to an opening position to open the A valve, the B valve element 25 moves to a closing position to close the B valve, and hence the pressure in the main valve driving pressure chamber d rises toward the primary pressure. Therefore, the main valve element 5 is moved in a closing direction by a force corresponding to the difference between pressures acting on the opposite sides thereof, respectively, and, eventually, the main valve opening b is adjusted automatically to a size corresponding to a flow rate set by operating the restrictor 11.

After the pressure difference across the restrictor 11 has reached a predetermined value, the A valve element and the B valve element are moved according to the variation of the pressure difference across the restrictor 11 due to the variation of the flow rate of the fluid on the upstream side. Thus the pressure in the main valve driving pressure chamber d is varied properly and the opening defined by the main valve element 5 and the main valve seat 4 is regulated to maintain the flow rate constant. Both the valve elements 24 and 25 are held stably at closing positions to close the A valve and the B valve substantially while the pressure difference across the restrictor 11 is stable.

The main valve unit can be set for a desired flow rate by operating the restrictor 11 by means of the handwheel 12 or the like. The fine adjustment of the flow rate can be achieved simply by adjusting the resilience of the spring 27 by means of an adjusting screw 28.

When the restrictor 11 is fully closed, the pressure receiving plate 23 of the pilot valve unit is pressed in a direction to compress the spring 27, the A valve element 24 is moved to the opening position to open the A valve and the B valve element 25 is moved to the closing position to close the B valve. Consequently, the main valve element 5 is pressed against the main valve seat 4. A sealing member, not shown, for the restrictor 11 must be capable of easily forming a tight sealed joint by a conventional technique. The fluid does not leak downstream even if the main valve driving member 6, the A valve element 24 and the B valve element 25 form loose sealed joints.

Since both the A valve and the B valve are not provided with any fixed flow control passage, such as a needle valve, the A valve and the B valve are rarely clogged with sand or dust. If, by any chance, the A valve and the B valve should be clogged, the valve elements 24 and 25 are moved automatically to the opening positions to open the A valve and the B valve in response to pressure change for a self-cleaning operation. Suppose, for example, that the A valve having the A valve element 24 is clogged. Then, the fluid of the primary pressure is unable to flow through the connecting passage p into the main valve driving pressure chamber d, the pressure in the main valve driving pressure chamber d decreases, the main valve element 5 is moved in an opening direction, and the flow rate of the fluid increases. Consequently, the pressure difference across the restrictor 11 increases, the force corresponding to the pressure difference exceeds the force of the spring 27, and the A valve element 24 is moved in an opening direction, so that matters clogging the A valve are removed automatically. Since the A valve and the B valve are capable of such a self-cleaning operation, the pilot valve unit need not be provided with a strainer of a fine mesh and work for the maintenance and management of the pilot valve unit is facilitated.

Since the A valve element 24 and the B valve element 25 are arranged on the spool 26 so as to move together relative to the fixed-pressure applying means (the spring 27), and the pilot valve unit has a simple, reasonable configuration capable of combining the primary and the secondary pressure therein and of quickly responding to the variation of the flow of the fluid by applying the combined pressure to the main valve driving pressure chamber d. The distance between the A valve element 24 and the B valve element 25 are determined so that the A valve element and the B valve element can be set in a state where one of the A valve and the B valve is open and the other is closed and in a state where both the A valve and the B valve are substantially closed. When the flow is stable, both the valve elements become stable substantially at the closing position and hence the chattering or hunting operation of the valve elements rarely occurs.

A second embodiment through a twenty-second embodiment will be described with reference to FIGS. 2 to 22.

Figure 2:
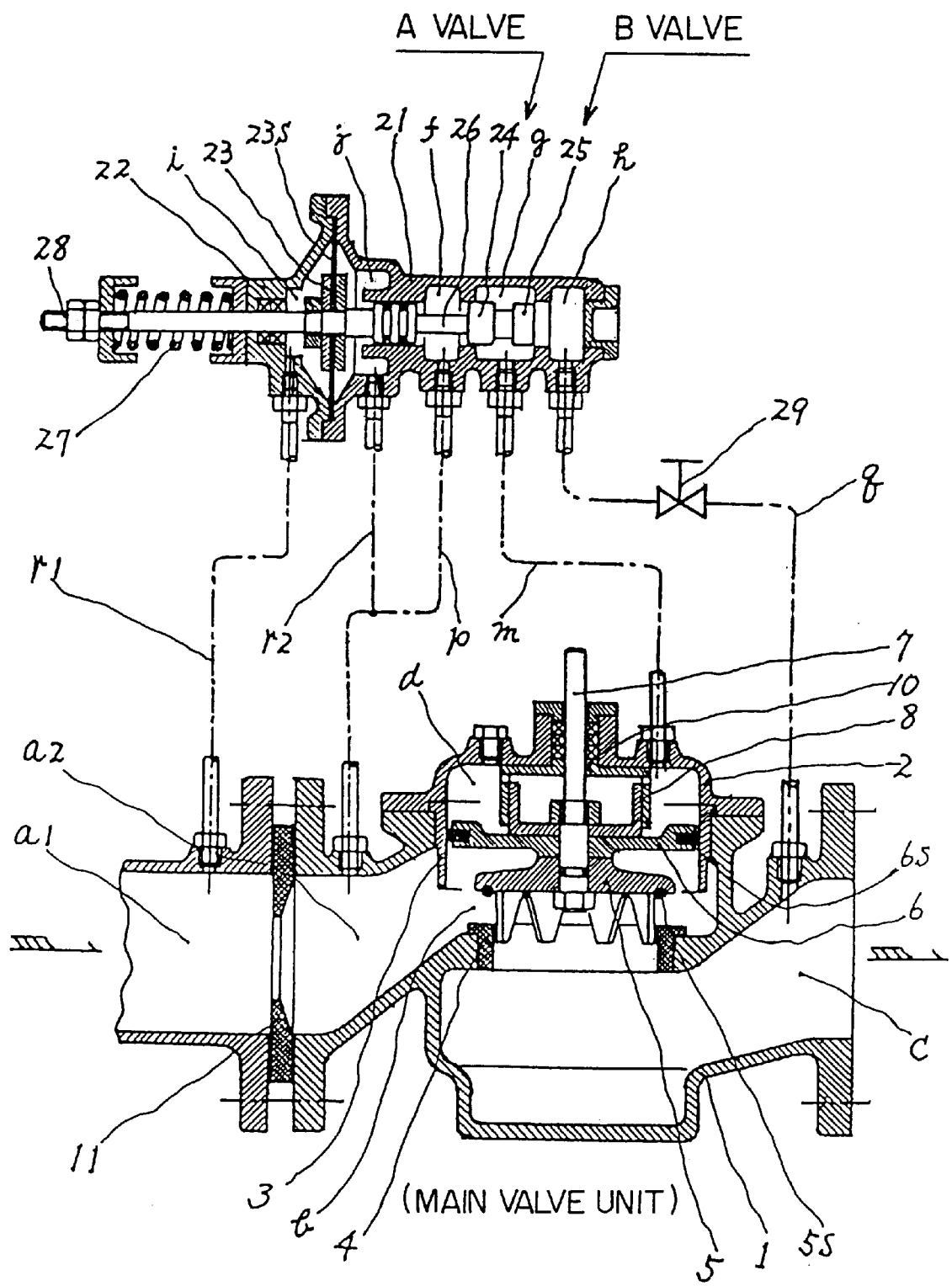
FIG. 2 is a longitudinal sectional view of an automatic regulating valve apparatus in a second embodiment of the present invention most closely relating to an automatic regulating valve apparatus stated in claims 1 and 3.

As shown in FIG. 2, a constant-flow valve apparatus in a second embodiment according to the present invention has a pilot valve unit different from that of the constant-flow valve apparatus in the first embodiment. The constant-flow valve apparatus shown in FIG. 2 has a pilot valve unit provided with an A valve element 24 and a B valve element 25 disposed in an intermediate chamber g and a spring 27 which exerts a force in a direction opposite to the direction in which the spring 27 of the first embodiment exerts its force for the same function, and a main valve unit provided with a replaceable orifice plate 11 instead of the restrictor 11 employed in the first embodiment. The constant-flow valve apparatus can be set for a desired flow rate by adjusting the resilience of the spring 27 by means of an adjusting screw 28.

A valve 29 placed in a connecting passage q connected to a B valve is used to close the main valve unit forcibly regardless of the operation of the pilot valve unit. Normally, the valve 29 is open. When it is desired to close the main valve unit, the valve 29 is closed. Consequently, the pressure in a main valve driving pressure chamber d rises toward the primary pressure, a main valve element 5 is moved in a closing direction, and a sealing member 5s attached to the main valve element 5 and a sealing member, not shown, included in the valve 29 form sealed joints.

Although the constant-flow valve apparatus in the second embodiment is somewhat different as mentioned above from the constant-flow valve apparatus in the first embodiment because the second embodiment is a modification of the first embodiment, the constant-flow valve apparatus in the second embodiment is similar in other respects, functions and effects to that in the first embodiment and hence further description thereof will be omitted.

Figure 3:
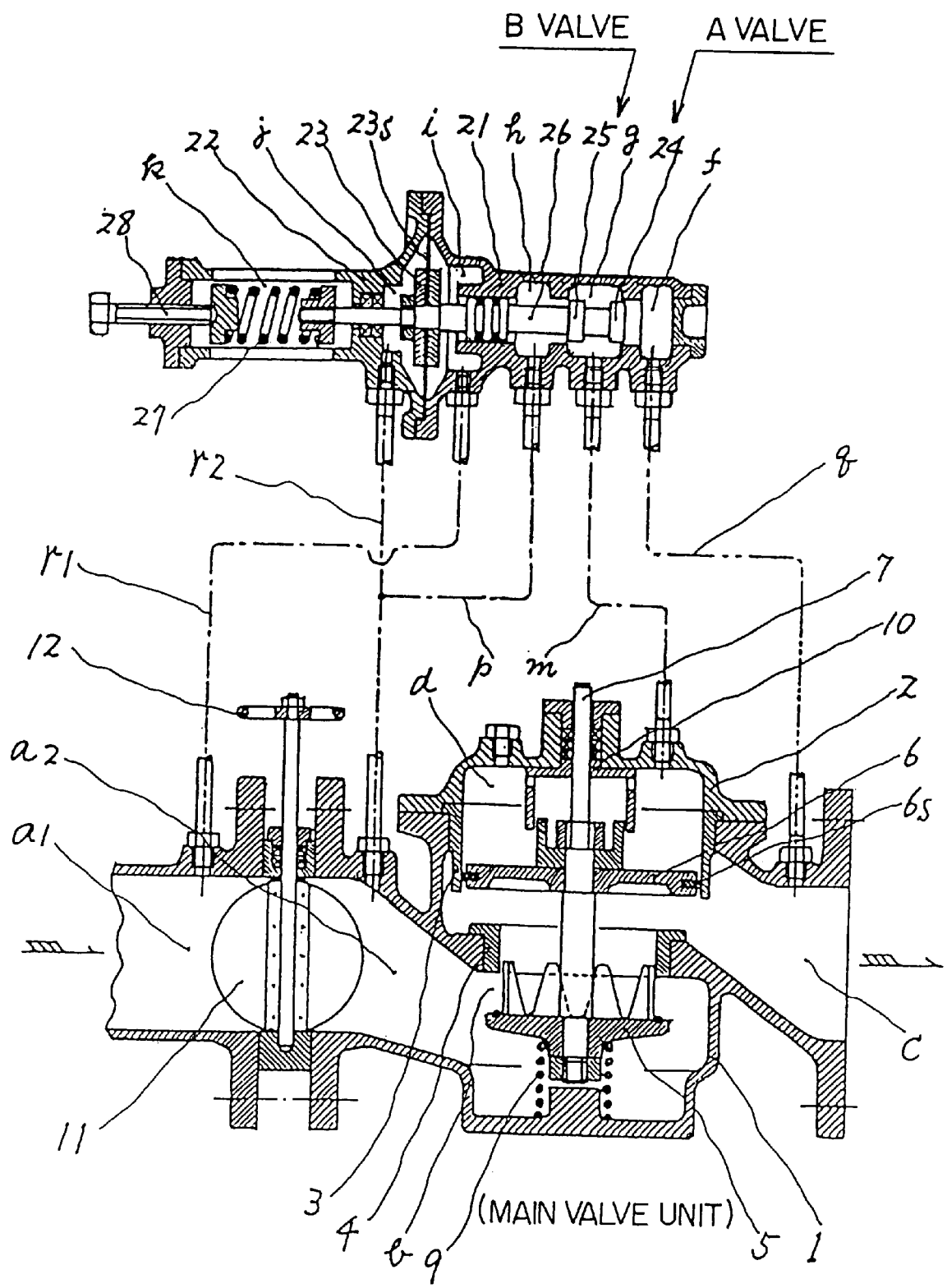
FIG. 3 is a longitudinal sectional view of an automatic regulating valve apparatus in a third embodiment of the present invention most closely relating to an automatic regulating valve apparatus stated in claims 1 and 2.

As shown in FIG. 3, a constant-flow valve apparatus in a third embodiment according to the present invention has a pilot valve unit different from that of the constant-flow valve apparatus in the first embodiment. The constant-flow valve apparatus shown in FIG. 3 has a pilot valve unit provided with an A valve element 24 and a B valve element 25 disposed in an intermediate chamber g, and a main valve unit provided with a main valve driving member 6 disposed on the downstream side of a main valve seat 4. Although the directions of movement of the main valve driving member 6 for functions are opposite to those of the main valve driving member 6 employed in the first embodiment for the same functions, an A valve and a B valve are placed in the order reverse to that in which the A valve and the B valve are arranged in the first embodiment, and the connection of connecting passages connecting an A valve and a B valve to an inlet passage a and an outlet passage c is reverse to that of the corresponding connecting passages to the inlet passage a and the outlet passage c in the first embodiment because the third embodiment is a modification of the first embodiment, the third embodiment is similar in other respects, functions and effects to that in the first embodiment and hence further description thereof will be omitted.

Although it is desirable to provide the main valve unit with a main valve spring 9 as shown in FIG. 3 to ensure the stable movement of the main valve element 5 at the start of passing a fluid through the main valve unit, the main valve spring 9 does not exercise any particular effect after the fluid has started flowing through the main valve unit and hence the main valve spring 9 may be omitted.

Figure 4:
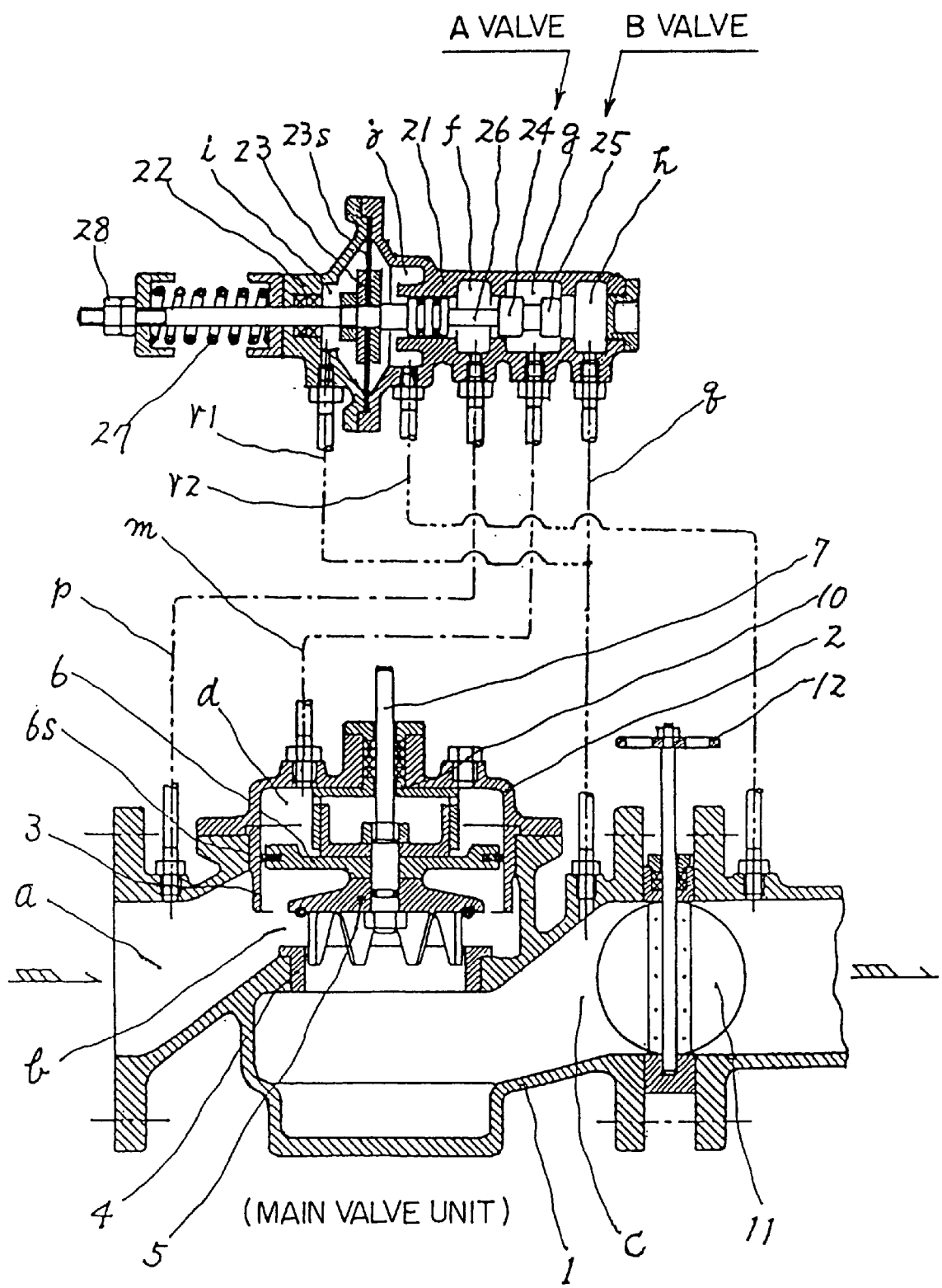
FIG. 4 is a longitudinal sectional view of an automatic regulating valve apparatus in a fourth embodiment of the present invention most closely relating to an automatic regulating valve apparatus stated in claims 1 and 2.

As shown in FIG. 4, a constant-flow valve apparatus in a fourth embodiment according to the present invention has a pilot valve unit different from that of the constant-flow valve apparatus in the first embodiment. The constant-flow valve apparatus shown in FIG. 4 has a pilot valve unit provided with an A valve element 24 and a B valve element 25 disposed in an intermediate chamber g and a spring 27 which exerts a force in a direction opposite to the direction in which the spring 27 of the first embodiment exerts its force for the same function, and a main valve unit provided with a restrictor 11 disposed on the downstream side thereof. Although the constant-flow valve apparatus in the fourth embodiment is somewhat different as mentioned above from the constant-flow valve apparatus in the first embodiment because the fourth embodiment is a modification of the first embodiment, the constant-flow valve apparatus in the fourth embodiment is similar in other respects, functions and effects to that in the first embodiment and hence further description thereof will be omitted.

Figure 5:
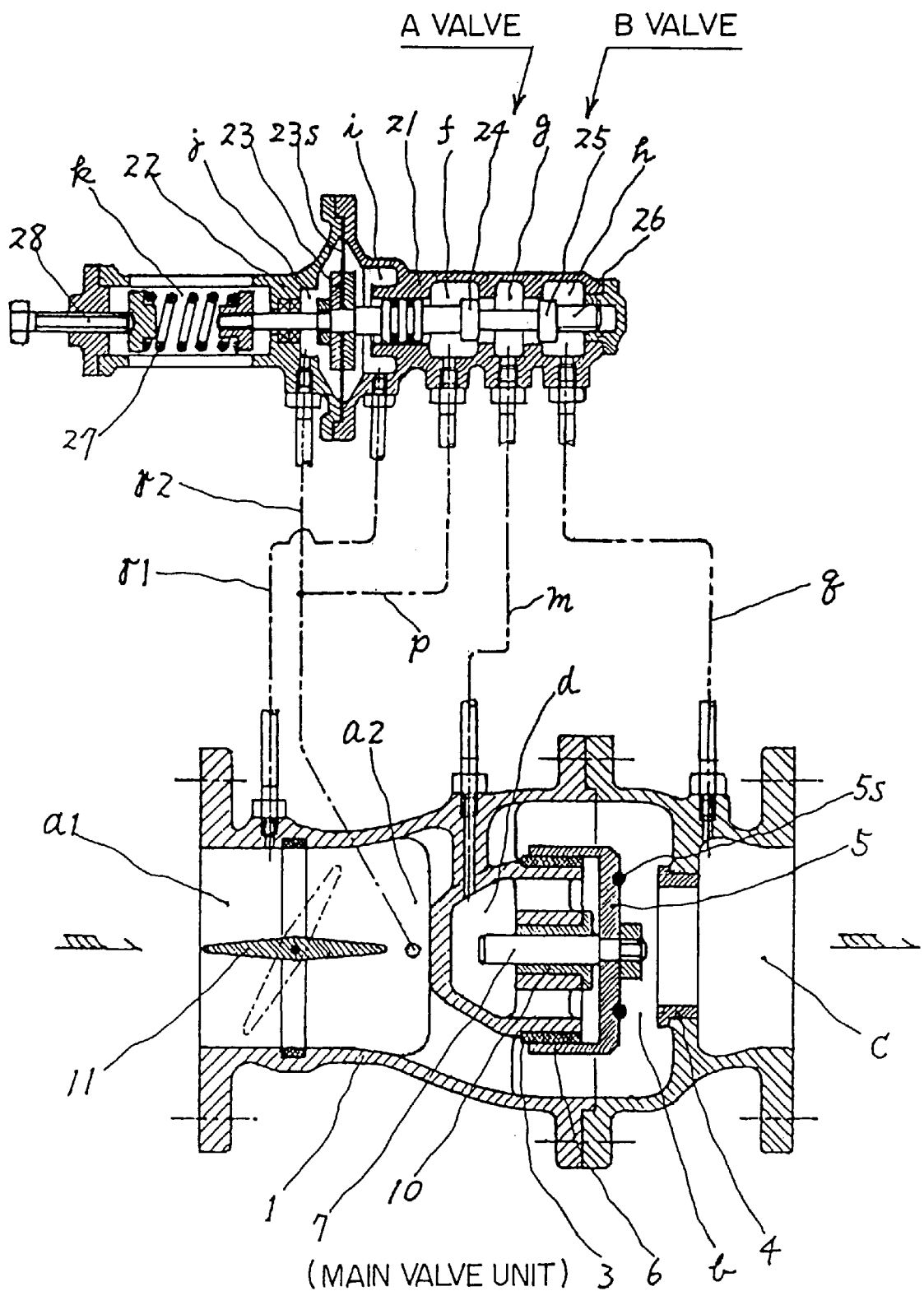
FIG. 5 is a longitudinal sectional view of an automatic regulating valve apparatus in a fifth embodiment of the present invention most closely relating to an automatic regulating valve apparatus stated in claims 1 and 2.

As shown in FIG. 5, a constant-flow valve apparatus in a fifth embodiment according to the present invention is provided with a main valve element serving as both a main valve element 5 and a main valve driving member 6 and disposed so as to move in directions along the direction of flow of a fluid through inlet passages a1 and a2 toward an outlet passage c. The constant-flow valve apparatus in the fifth embodiment is similar in other respects, functions and effects to that in the first embodiment and hence further description thereof will be omitted.

Figure 6:
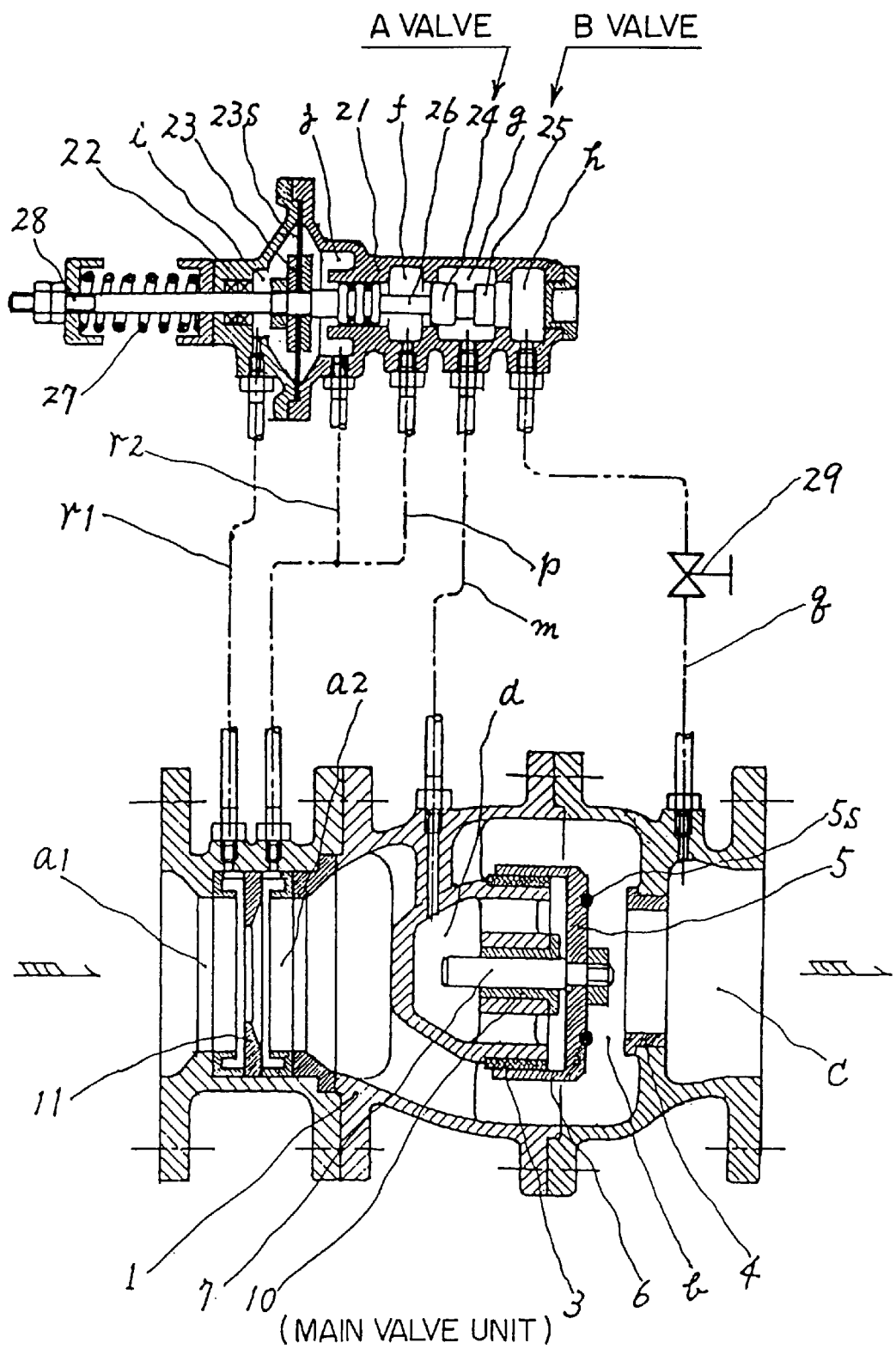
FIG. 6 is a longitudinal sectional view of an automatic regulating valve apparatus in a sixth embodiment of the present invention most closely relating to an automatic regulating valve apparatus stated in claims 1 and 3.

As shown in FIG. 6, a constant-flow valve apparatus in a sixth embodiment according to the present invention is similar in construction as that in the second embodiment. As shown in FIG. 6, the constant-flow valve apparatus in the sixth embodiment is provided with a main valve element serving as both a main valve element 5 and a main valve driving member 6 and disposed so as to move in directions along the direction of flow of a fluid through inlet passages a1 and a2 toward an outlet passage c, and an orifice plate 11 provided with grooves in the front and the back surface thereof to prevent the influence of turbulent flows on the pressure difference across the orifice plate 11. The constant-flow valve apparatus in the sixth embodiment is similar in other respects, functions and effects to that in the second embodiment and hence further description thereof will be omitted.

Figure 7:
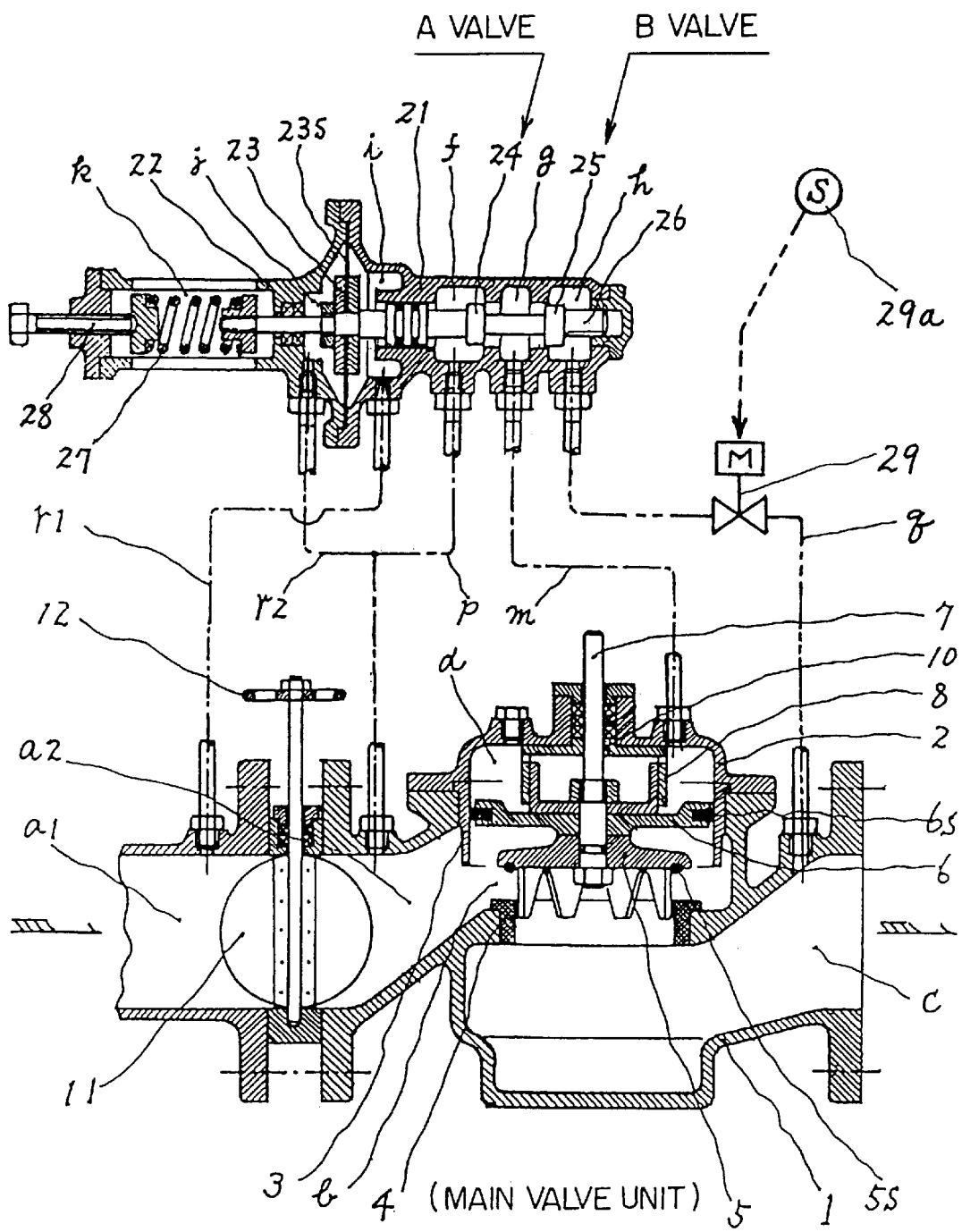
FIG. 7 is a longitudinal sectional view of an automatic regulating valve apparatus in a seventh embodiment of the present invention most closely relating to an automatic regulating valve apparatus stated in claim 4.

As shown in FIG. 7, a constant-flow valve apparatus in a seventh embodiment according to the present invention is formed by placing a valve 29 which closes upon the detection of an abnormal condition in the environment by an abnormal condition detector 29a in the connecting passage q connected to the B valve of the first embodiment. The constant-flow valve apparatus in the seventh embodiment is similar in construction to the constant-flow valve apparatus in the first embodiment and has an emergency shutoff function to shutoff the associated pipeline automatically in an emergency, such as the occurrence of a fire or an earthquake or abnormal pressure rise or drop in the associated pipeline in addition to the functions of the constant-flow valve apparatus in the first embodiment.

When the connecting passage q is closed by the valve 29, the pressure in the main valve driving pressure chamber d rises to seat the main valve element 5 on the main valve seat 4. The valve 29 and the abnormal condition detector 29a may be combined by a well-known method; the valve 29 may be driven by an electric signal provided by a detector 29a (sensor) if the valve 29 is a motor-driven or solenoid-driven valve or may mechanically be combined with the detector 29a.

The constant-flow valve apparatus in the seventh embodiment is similar in other respects, functions and effects to that in the first embodiment and hence further description thereof will be omitted.

Needless to say, the second to the sixth embodiment, as well as the first embodiment, may additionally be provided with the valve 29 and the abnormal condition detector 29a.

Figure 8:
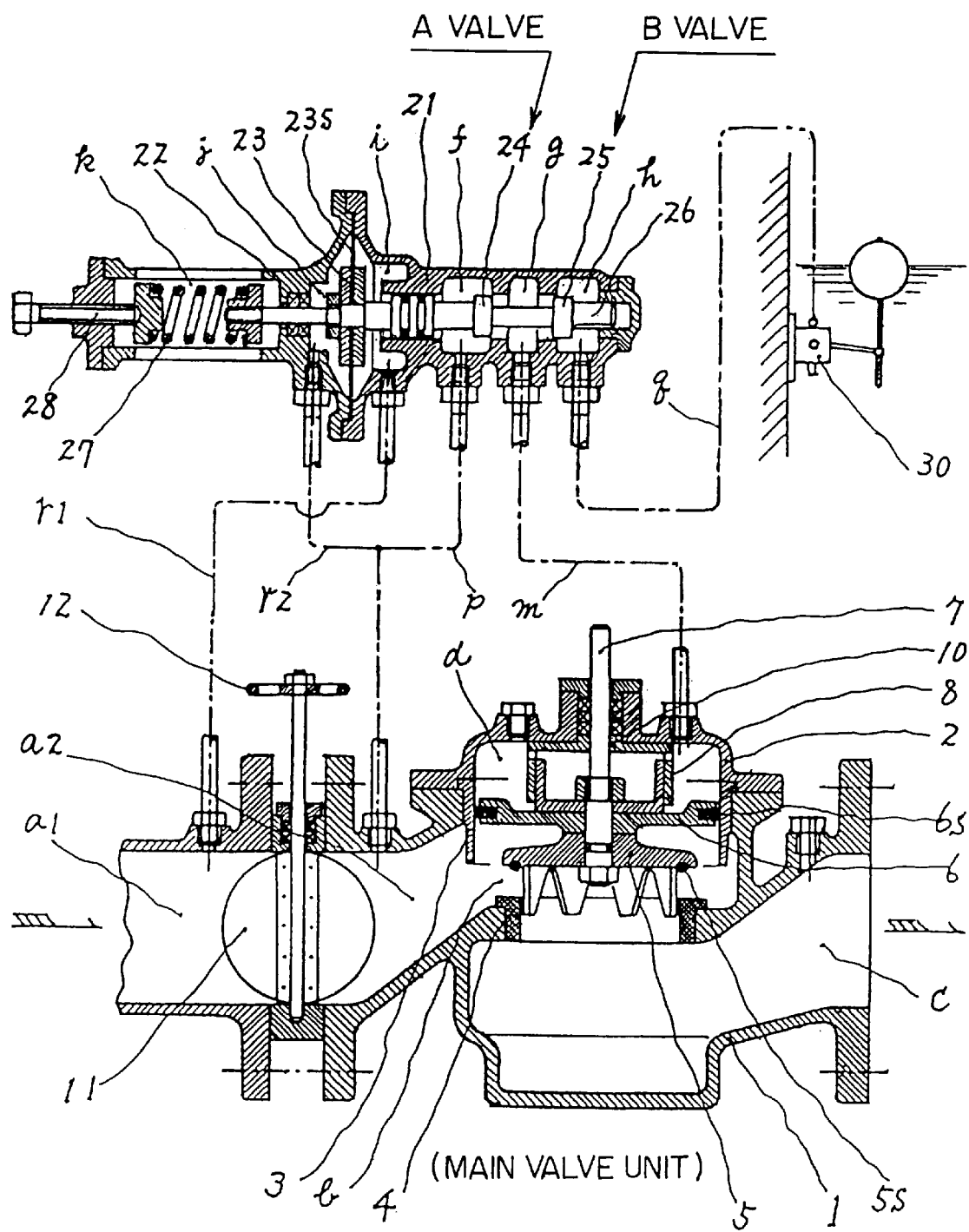
FIG. 8 is a longitudinal sectional view of an automatic regulating valve apparatus in an eighth embodiment of the present invention most closely relating to an automatic regulating valve apparatus stated in claim 5.

As shown in FIG. 8, a valve apparatus in an eighth embodiment of the present invention is formed by placing a valve 30 which closes when the liquid level on the downstream side of the main valve rises above a predetermined liquid level and opens when the liquid level falls below the predetermined liquid level in the connecting passage q connected to the B valve of the first embodiment. The constant-flow valve apparatus in the eighth embodiment has a liquid level control function in addition to the functions of the constant-flow valve in the first embodiment.

As shown in FIG. 8, a valve 30 is, for example, a generally known float valve 30 disposed near the surface of the liquid on the downstream side of a main valve. The float valve 30 opens when the liquid level is lower than a predetermined liquid level to enable the fluid to flow through a connecting passage q and closes upon the rise of the liquid level to the predetermined liquid level.

Since the valve apparatus functions as a constant-flow valve apparatus while the liquid level is lower than the predetermined level, the liquid is delivered very moderately and the liquid is not supplied at an excessively high flow rate even if the primary pressure is high. When the liquid level reaches the predetermined liquid level, the float valve 30 closes, the pressure in a main valve driving pressure chamber d rises to seat a main valve element 5 on a main valve seat 4, and a sealing member 5s attached to the main valve element 5, and a sealing member, not shown, included in the float valve 30 form sealed joints.

The constant-flow valve apparatus in the eighth embodiment is similar in other respects, functions and effects to that in the first embodiment and hence further description thereof will be omitted.

Needless to say, the second to the seventh embodiment, as well as the first embodiment, may additionally be provided with the float valve 30.

Figure 9:
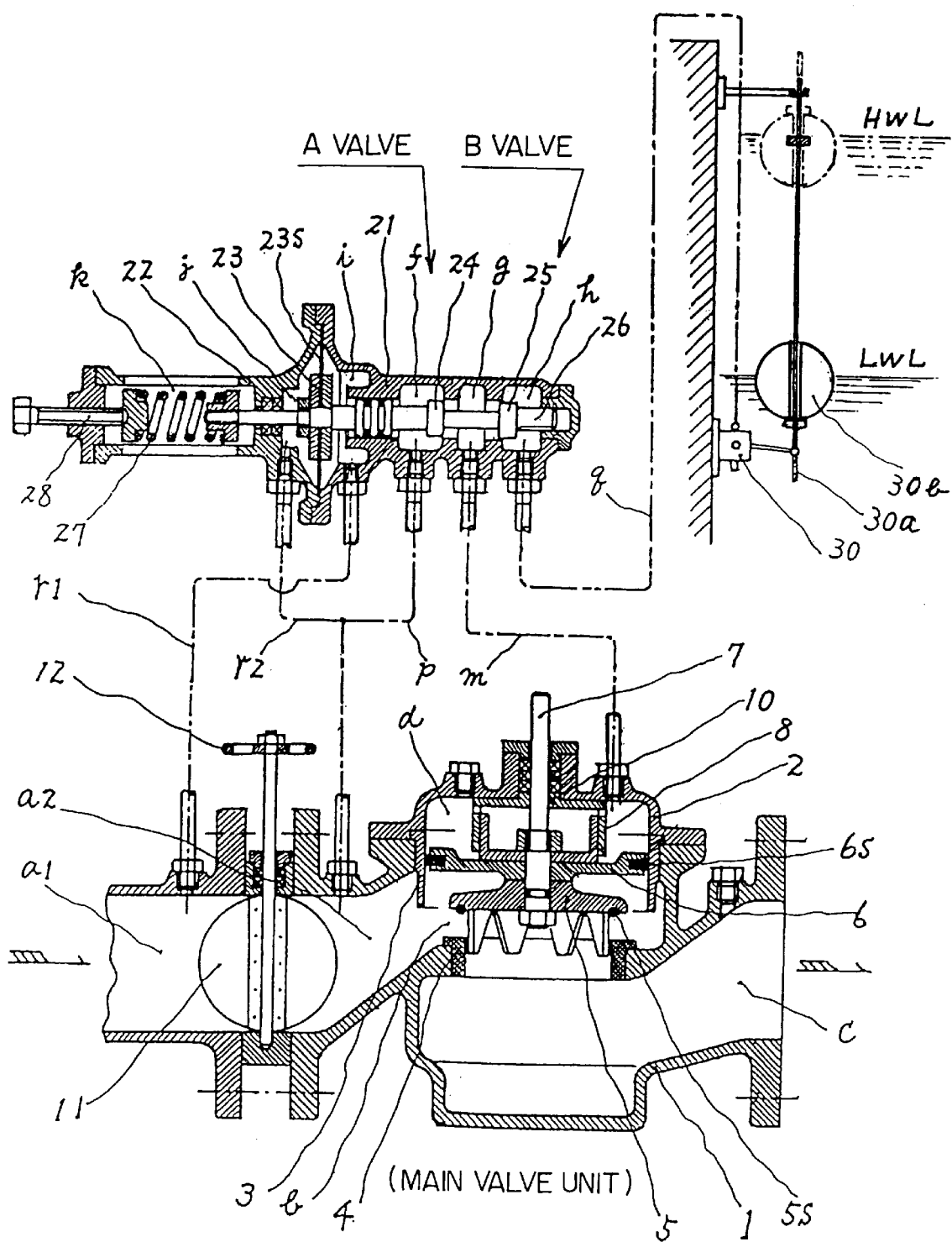
FIG. 9 is a longitudinal sectional view of an automatic regulating valve apparatus in a ninth embodiment of the present invention most closely relating to an automatic regulating valve apparatus stated in claim 6.

A valve apparatus in a ninth embodiment of the present invention is similar in construction to the valve apparatus in the eighth embodiment. As shown in FIG. 9, the valve apparatus in the ninth embodiment is provided with a float valve 30 similar to the float valve 30 employed in the eighth embodiment. The float valve 30 shown in FIG. 9 closes when the liquid level on the downstream side of a main valve unit rises above an upper limit liquid level (HWL) and opens when the liquid level falls below a lower limit liquid level (LWL) to control the liquid level between the upper limit liquid level and the lower limit liquid level.

A float 30b of the float valve 30 placed in series in a connecting passage q is supported on a float shaft 30a for movement between stoppers disposed at a position near the upper end of the float shaft 30a and a position near the lower end of the float shaft 30a. It is desirable to brake the float shaft 30a by applying a frictional resistance to the float shaft 30a or to apply a fixed force to the valve element of the float valve 30 to settle the valve element in an open state or a closed state to prevent the movement of the float shaft 30a by a frictional dragging action of the float 30b sliding along the float shaft 30a according to the variation of the liquid level between the upper and the lower limit liquid level, and the resultant faulty operation of the float valve apparatus 30.

The float 30b comes into contact with the stopper attached to the float shaft 30a at a position near the lower end of the float shaft 30a and depresses the float shaft 30a when the liquid level falls to the predetermined lower limit liquid level. Consequently, the float valve 30 is opened, the pressure in a main valve driving pressure chamber d drops, a main valve element 5 is moved away from a main valve seat 4, and the liquid is supplied downstream through the main valve unit. In this state, the valve apparatus serves as a constant-flow valve apparatus.

The float 30b comes into contact with the stopper attached to the float shaft 30a at a position near the upper end of the float shaft 30a and pushes up the float shaft 30a when the liquid level rises to the predetermined upper limit liquid level. Consequently, the float valve 30 is closed, the pressure in the main valve driving pressure chamber d rises, the main valve element 5 is seated on the main valve seat 4. In this state, a sealing member 5s attached to the main valve element 5 and a sealing member, not shown, included in the float valve 30 form sealed joints.

The valve apparatus in the ninth embodiment is similar in other respects, functions and effects to that in the eighth embodiment and hence the further description thereof will be omitted.

Figure 10:
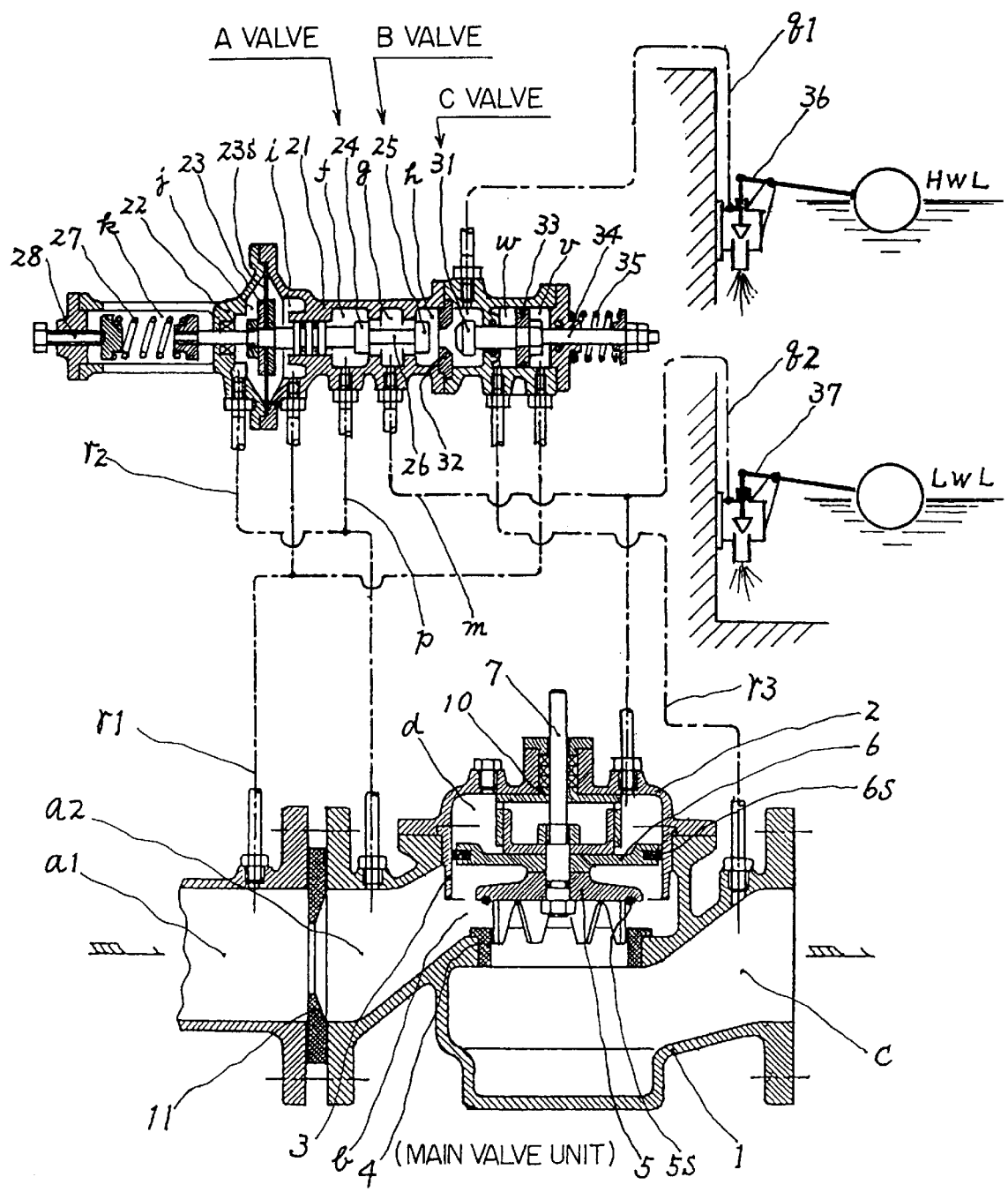
FIG. 10 is a longitudinal sectional view of an automatic regulating valve apparatus in a tenth embodiment of the present invention most closely relating to an automatic regulating valve apparatus stated in claim 7.

A valve apparatus in a tenth embodiment of the present invention is similar in construction to the valve apparatus in the ninth embodiment. As shown in FIG. 10, the valve apparatus in the tenth embodiment is provided with two float valves 36 and 37 assigned to the detection of the liquid level to the predetermined upper limit liquid level and to the predetermined lower limit liquid level, respectively. The valve apparatus of this configuration is suitable when the difference between the upper limit and the lower limit liquid level is great.

The valve apparatus in the tenth embodiment is provided, instead of the float valve 30 employed in the ninth embodiment, with a C valve which closes when the pressure difference across a main valve unit rises above a predetermined value and opens when the same falls below the predetermined value, the first float valve 36 which closes when the liquid level on the downstream side of the main valve unit rises above the predetermined upper liquid level and opens when the same falls below the upper limit liquid level, and the second float valve 37 which closes when the liquid level on the downstream side of the main valve unit rises above the lower limit liquid level and opens when the same falls below the predetermined lower limit liquid level. The C valve and the first float valve 36 are placed in series in a connecting passage q1 connected to a B valve. A main valve driving pressure chamber d is connected to the second float valve 37 by a connecting passage q2.

A C valve element 31 included in the C valve is formed integrally with a spool 34 separate from a spool 26 included in A and B valves, and a pressure receiving plate 33 included in the C valve is fixedly mounted on the spool 34. A primary pressure chamber v and a secondary pressure chamber w are formed on the opposite sides of the pressure receiving plate 33, respectively. The primary pressure chamber v is connected to the inlet passage a1 by a connecting passage r1, and the secondary pressure chamber w is connected to the outlet passage c by a connecting passage r3.

Both the first float valve 36 and the second float valve 37 are open and hence the pressure in the main valve driving pressure chamber d is equal to the secondary pressure while the liquid level is below the predetermined lower limit liquid level. Therefore, a main valve element 5 is at its fully open position and the liquid flows at a maximum flow rate toward the downstream side of the main valve unit. In this state, the pressure difference between the primary pressure chamber v and the secondary pressure chamber w, i.e., the pressure difference across the main valve unit, is small, the force of a spring 35 exceeds a force corresponding to the pressure difference between the primary pressure chamber v and the secondary pressure chamber w, and hence the C valve is open.

The second float valve 37 closes first when the liquid level rises as the liquid is supplied. In this state, the C valve element 31 is still at an open position and the first float valve 36 is open. Therefore, the pressure in the main valve driving pressure chamber d is controlled by the A valve and the B valve, and the valve apparatus serves as a constant-flow valve apparatus to enable the liquid to flow through the main valve unit toward the downstream side at a constant flow rate. Since the C valve element 31 is at its open position and does not affect the flow of the liquid through the connecting passage q1 caused by the operation of the A valve and the B valve, the C valve element 31 does not interfere with a constant-flow control function.

When the liquid level reaches the predetermined upper limit liquid level, the first float valve 36 closes, the pressure in the main valve driving pressure chamber d rises toward the primary pressure to seat the main valve element 5 on the valve seat 4. In this state, the sealing member 5s attached to the main valve element 5, and sealing members, not shown, included in the float valves 36 and 37 form sealed joints. The pressure difference between the primary pressure chamber v and the secondary pressure chamber w increases, and a force corresponding to the pressure difference between the primary pressure chamber v and the secondary pressure chamber w exceeds the force of the spring 35 and the C valve element 31 is pressed against a C valve seat 32 to close the C valve.

The liquid level on the downstream side of the main valve unit falls as the liquid is used. Then, the first float valve 36 opens, while the C valve is still closed and the second float valve 37 is closed. Therefore, the pressure in the main valve driving pressure chamber d is equal to the primary pressure and the main valve unit remains closed.

When the liquid level falls further to the predetermined lower limit liquid level, the second float valve 37 opens, the pressure in the main valve driving pressure chamber d decreases toward the secondary pressure, the main valve element 5 is moved away from the main valve seat 4, and the liquid is supplied through the main valve unit at the maximum flow rate. In this state, the pressure difference between the primary pressure chamber v and the secondary pressure chamber w decreases, the force of the spring 35 exceeds a force corresponding to the pressure difference between the primary pressure chamber y and the secondary pressure chamber w, and the C valve element 31 is separated from the C valve seat 32.

Thus the liquid level is controlled so as to vary in the range between the predetermined upper limit liquid level and the predetermined lower limit liquid level.

The main valve unit is provided with a replaceable fixed orifice plate 11, and a desired flow rate can be set by adjusting the resilience of the spring 27.

The valve apparatus in the tenth embodiment is similar in other respects, functions and effects to that in the ninth embodiment and hence further description thereof will be omitted.

Figure 11:
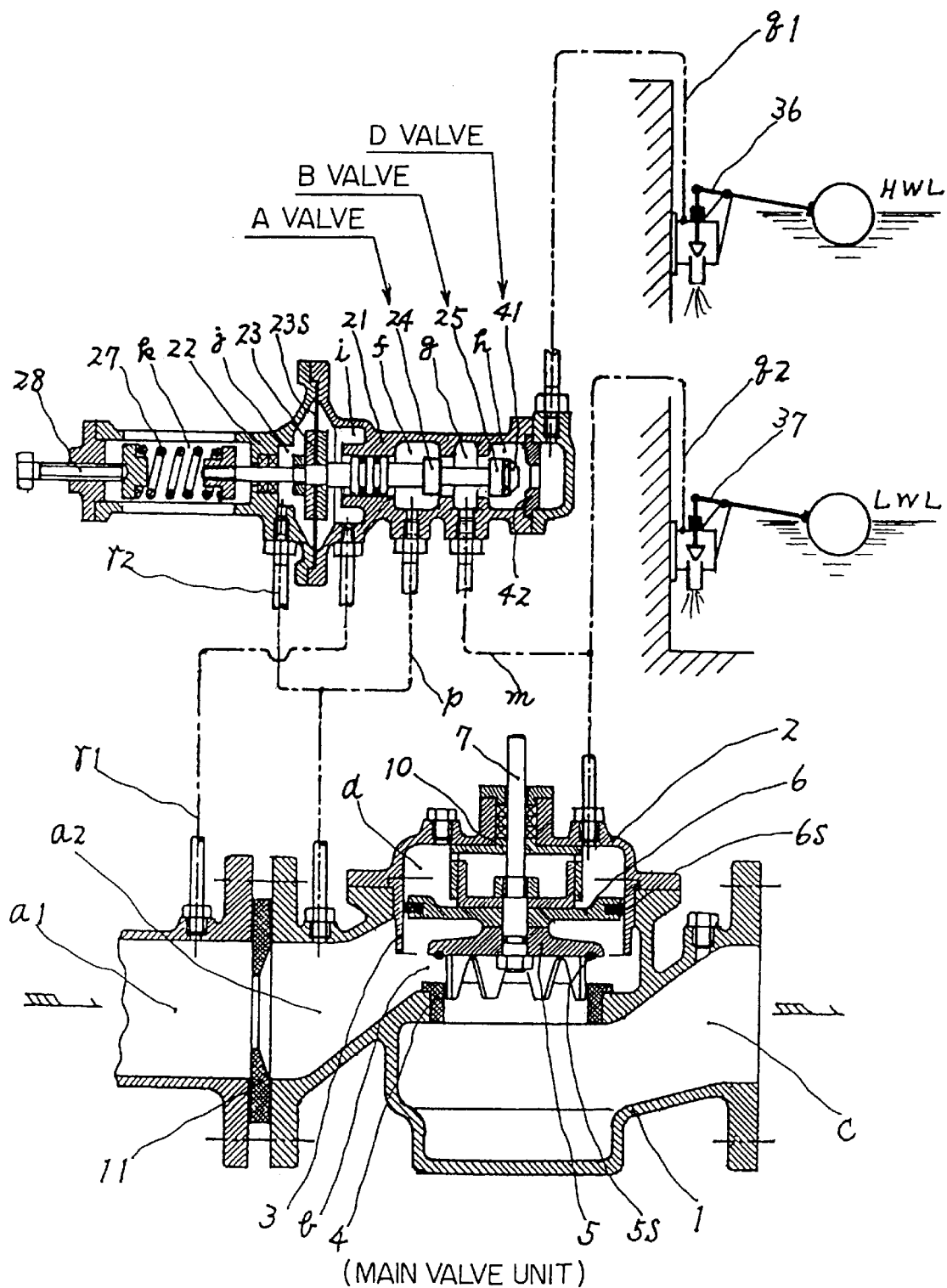
FIG. 11 is a longitudinal sectional view of an automatic regulating valve apparatus in an eleventh embodiment of the present invention most closely relating to an automatic regulating valve apparatus stated in claims 8 and 9.

A valve apparatus in an eleventh embodiment of the present invention shown in FIG. 11 is similar in construction to that in the tenth embodiment, except that the valve apparatus in the eleventh embodiment employs, instead of the C valve, a D valve which is more compact than the C valve.

The D valve opens when the pressure difference across an orifice plate 11 is larger than a predetermined value and closes when the same is smaller than the predetermined value. The D valve and a first float valve 36 are placed in series in a connecting passage q1 connected to a B valve, and a main valve driving pressure chamber d is connected to a second float valve 37 by a connecting passage q2. An A valve element 24, a B valve element 25 and a D valve element 41 are formed integrally with a pilot spool. The three valve elements 24, 25 and 41 are moved together by the balance of counteracting forces exerted by the pressure difference across the orifice plate 11 and a spring 27 so that the same may not obstruct each other.

The operation of the valve apparatus in the eleventh embodiment is different from that of the valve apparatus in the tenth embodiment. The C valve element included in the C valve employed in the tenth embodiment is moved to its closed position by a force corresponding to the pressure difference across the main valve unit which increases when the main valve unit is closed. A D valve element included in the D valve employed in the eleventh embodiment is moved to its closed position by the effect of the reduction of the pressure difference across the orifice plate 11 to naught when the main valve unit is closed.

When the main valve unit is open for supply of liquid, a force corresponding to the pressure difference between an ante-orifice pressure chamber i and a post-orifice pressure chamber j, i.e., the pressure difference across the orifice plate 11, counteracts the force of a spring 27, an A valve element 24 and a B valve element 25 are moved by the balance of those forces, and the D valve element 41 is always separated from the D valve seat 42 to open the D valve. When the main valve unit is closed, the pressure difference across the orifice plate 11 drops to zero, and the D valve element 41 is pressed against the D valve seat 42 by the force of the spring 27 to close the D valve.

Thus, the valve apparatus, similarly to the valve apparatus in the tenth embodiment, is capable of controlling the liquid level between an upper limit liquid level and a lower limit liquid level. The valve apparatus in the eleventh embodiment is similar in other respects, functions and effects to that in the tenth embodiment and hence further description thereof will be omitted.

Figure 12:
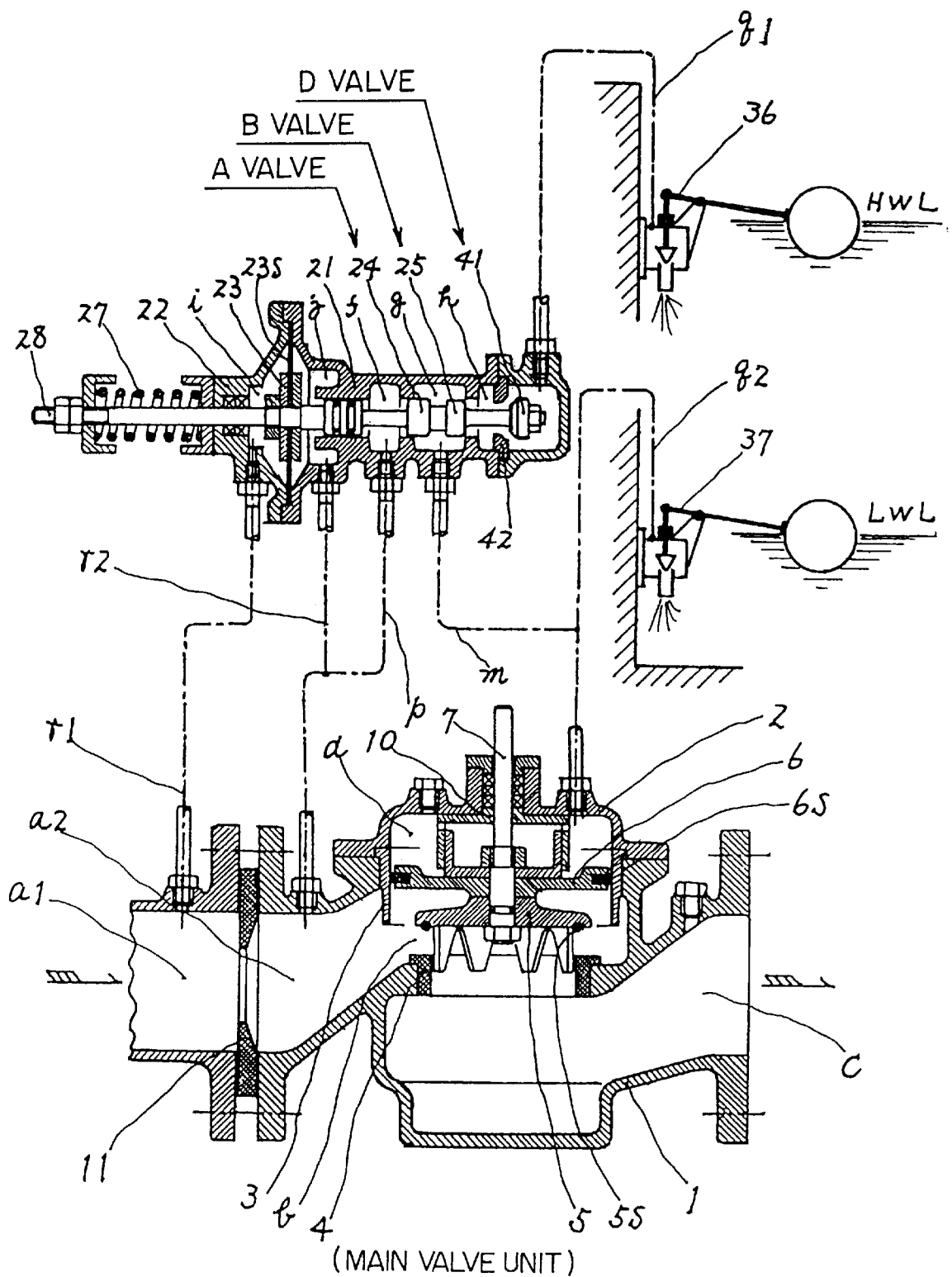
FIG. 12 is a longitudinal sectional view of an automatic regulating valve apparatus in a twelfth embodiment of the present invention most closely relating to an automatic regulating valve apparatus stated in claims 8 and 9.

As shown in FIG. 12, a valve apparatus in a twelfth embodiment according to the present invention is similar in construction to that in the eleventh embodiment, except that the former has a pilot valve unit different from that of the valve apparatus in the eleventh embodiment. As shown in FIG. 12, an A valve element 24 and a B valve element 25 are disposed in an intermediate chamber g, a spring 27 exerts a force in a direction opposite to the direction in which the spring 27 of the eleventh embodiment exerts its force for the same function, and a D valve element 41 moves in directions opposite to those in which the D valve element 41 in the eleventh embodiment moves for the same functions. Although the arrangement of connecting passages in the twelfth embodiment is somewhat different from that of the corresponding connecting passages in the eleventh embodiment because the valve apparatus in the twelfth embodiment is a modification of the valve apparatus in the eleventh embodiment, the valve apparatus in the twelfth embodiment is similar in other respects, functions and effects to that in the eleventh embodiment and hence further description thereof will be omitted.

Figure 13:
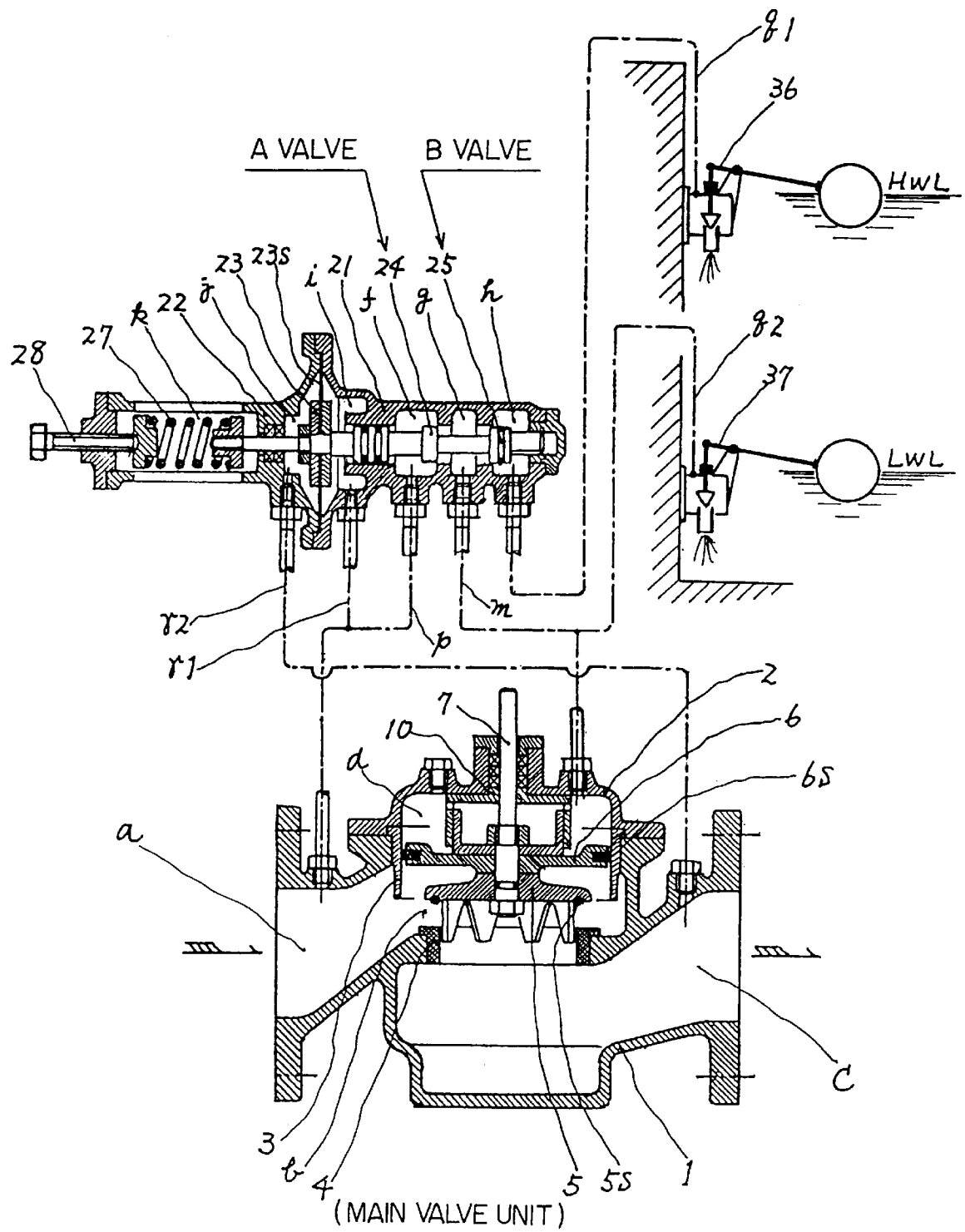
FIG. 13 is a longitudinal sectional view of an automatic regulating valve apparatus in a thirteenth embodiment of the present invention most closely relating to an automatic regulating valve apparatus stated in claim 10.

A valve apparatus in a thirteenth embodiment according to the present invention shown in FIG. 13 is formed by removing the constant-flow control functions from the valve apparatus in the eleventh embodiment and is designed specially only for a liquid level control function.

As shown in FIG. 13, the valve apparatus is not provided any members corresponding to the orifice plate 11 and the D valve of the valve apparatus in the eleventh embodiment, and a primary pressure chamber i and a secondary pressure chamber j are formed on the opposite sides of a pressure receiving plate 23 and connected to an inlet passage a and an outlet passage c, respectively. An A valve and a B valve are operated for opening and closing according to the variation of the pressure difference across a main valve unit to control the liquid level between a predetermined upper limit liquid level and a predetermined lower limit liquid level.

While the liquid level is lower than the predetermined lower limit liquid level, a first float valve 36 and a second float valve 37 are open, the pressure in a main valve driving pressure chamber d is equal to the secondary pressure, and hence a main valve element 5 is at its open position to allow the liquid to flow downstream through the main valve unit. In this state, in a pilot valve unit, the pressure difference between the primary pressure chamber i and the secondary pressure chamber j, i.e., pressure difference across the main valve unit, is small, the force of a spring 27 exceeds a force corresponding to the pressure difference, and hence an A valve element 24 is at its closed position and a B valve element 25 is at its open position.

When the liquid is supplied continuously and the liquid level rises, the second float valve 37 is closed, whereas the B valve element 25 still remains at its open position and the first float valve 36 still remains open, the pressure in the main valve driving pressure chamber d is kept at the secondary pressure and hence the fluid continues flowing through the main valve unit.

Upon the rise of the liquid level to the predetermined upper limit liquid level, the first float valve 36 is closed, the pressure in the main valve driving pressure chamber d rises toward the primary pressure to move the main valve element 5 to its closed position, and a sealing member 5s attached to the main valve element 5, and sealing members, not shown, included in the float valves 36 and 37 form sealed joints. In this state, in the pilot valve unit, the pressure difference between the primary pressure chamber i and the secondary pressure chamber j increases and a force corresponding to the pressure difference between the primary pressure chamber i and the secondary pressure chamber j exceeds the force of the spring 27 and, consequently, the A valve element 24 is moved to its open position and the B valve element 25 is moved to its closed position.

The liquid level falls as the liquid on the downstream side of the main valve unit is used. Then, the first float valve 36 opens first, while the B valve element 25 remains at its closed position and the second float valve 37 is closed. Consequently, the pressure in the main valve driving pressure chamber d remains equal to the primary pressure and the main valve unit remains closed.

The liquid level falls further, and the second float valve 37 opens upon the fall of the liquid level to the predetermined lower limit liquid level. Consequently, the pressure in the main valve driving pressure chamber d decreases toward the secondary pressure, the main valve element 5 is moved to its open position to resume supplying the liquid through the main valve unit. Since the pressure difference between the primary pressure chamber i and the secondary pressure chamber j is small in this state, the force of the spring 27 exceeds a force corresponding to the pressure difference, the A valve element 24 is moved to its closed position and the B valve element 25 is moved to its open position.

The valve apparatus does not have any constant-flow control function and is capable of only controlling the liquid level between the predetermined upper and the predetermined lower limit liquid level. The valve apparatus in the thirteenth embodiment is similar in other respects, functions and effects to that in the eleventh embodiment and hence further description thereof will be omitted.

Figure 14:
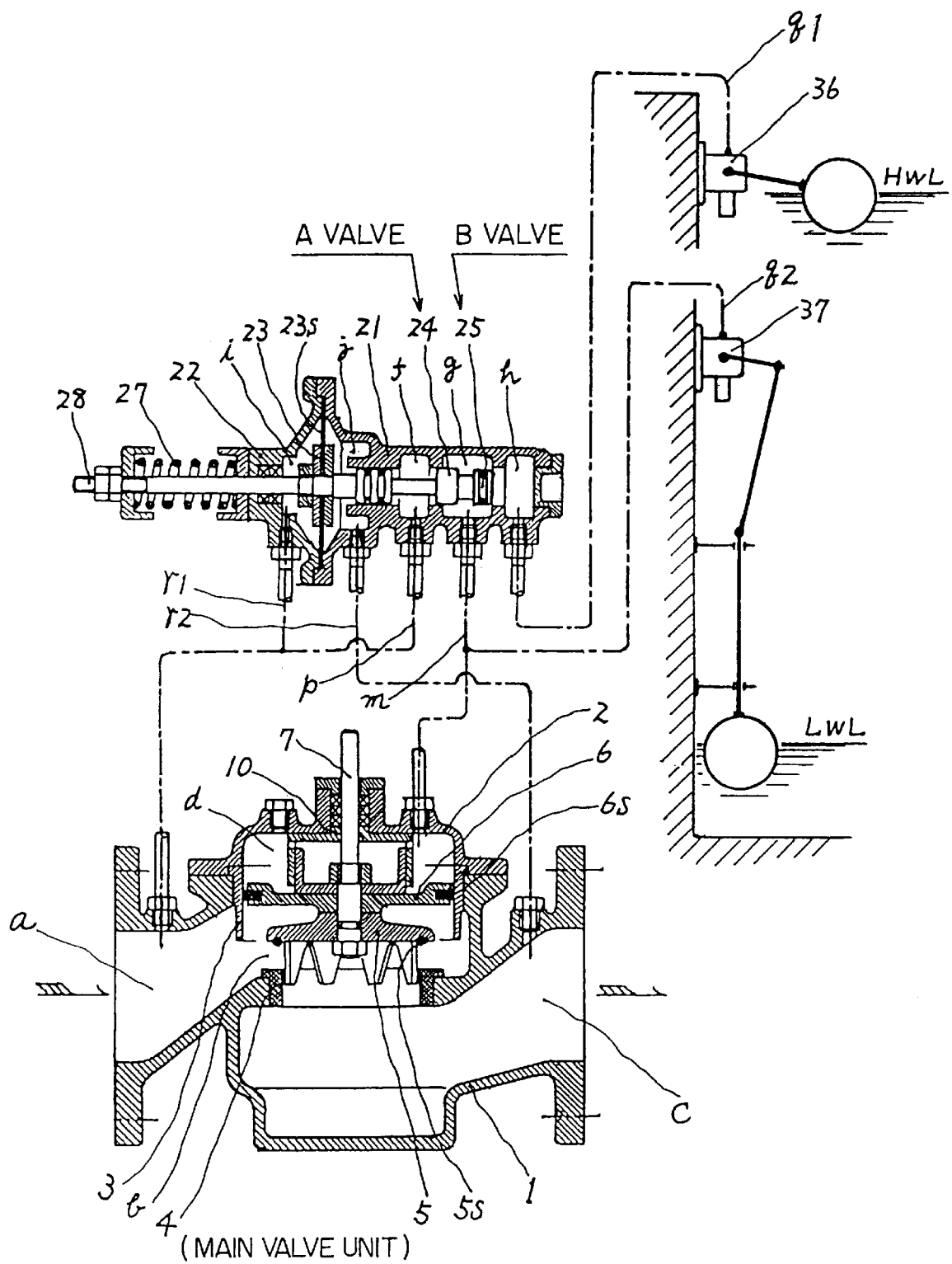
FIG. 14 is a longitudinal sectional view of an automatic regulating valve apparatus in a fourteenth embodiment of the present invention most closely relating to an automatic regulating valve apparatus stated in claim 10.

A valve apparatus in a fourteenth embodiment of the present invention shown in FIG. 14 is similar to the valve apparatus in the thirteenth embodiment and is provided with a pilot valve unit different from that of the valve apparatus in the thirteenth embodiment. As shown in FIG. 14, an A valve element 24 and a B valve element 25 are placed in an intermediate chamber g, and a spring 27 exerts a force in a direction opposite to the direction in which the spring 27 of the thirteenth embodiment exerts its force for the same function. Although the arrangement of connecting passages in the fourteenth embodiment is somewhat different from that of the corresponding connecting passages in the thirteenth embodiment because the valve apparatus in the fourteenth embodiment is a modification of the valve apparatus in the thirteenth embodiment, the valve apparatus in the fourteenth embodiment is similar in other respects, functions and effects to that in the thirteenth embodiment and hence further description thereof will be omitted.

In the fourteenth embodiment, a second float valve 37 need not necessarily be disposed near a lower limit liquid level; the second float valve 37 may be disposed at an optional position and is able to achieve the remote detection of the liquid level by using connecting members, such as rods.

Figure 15:
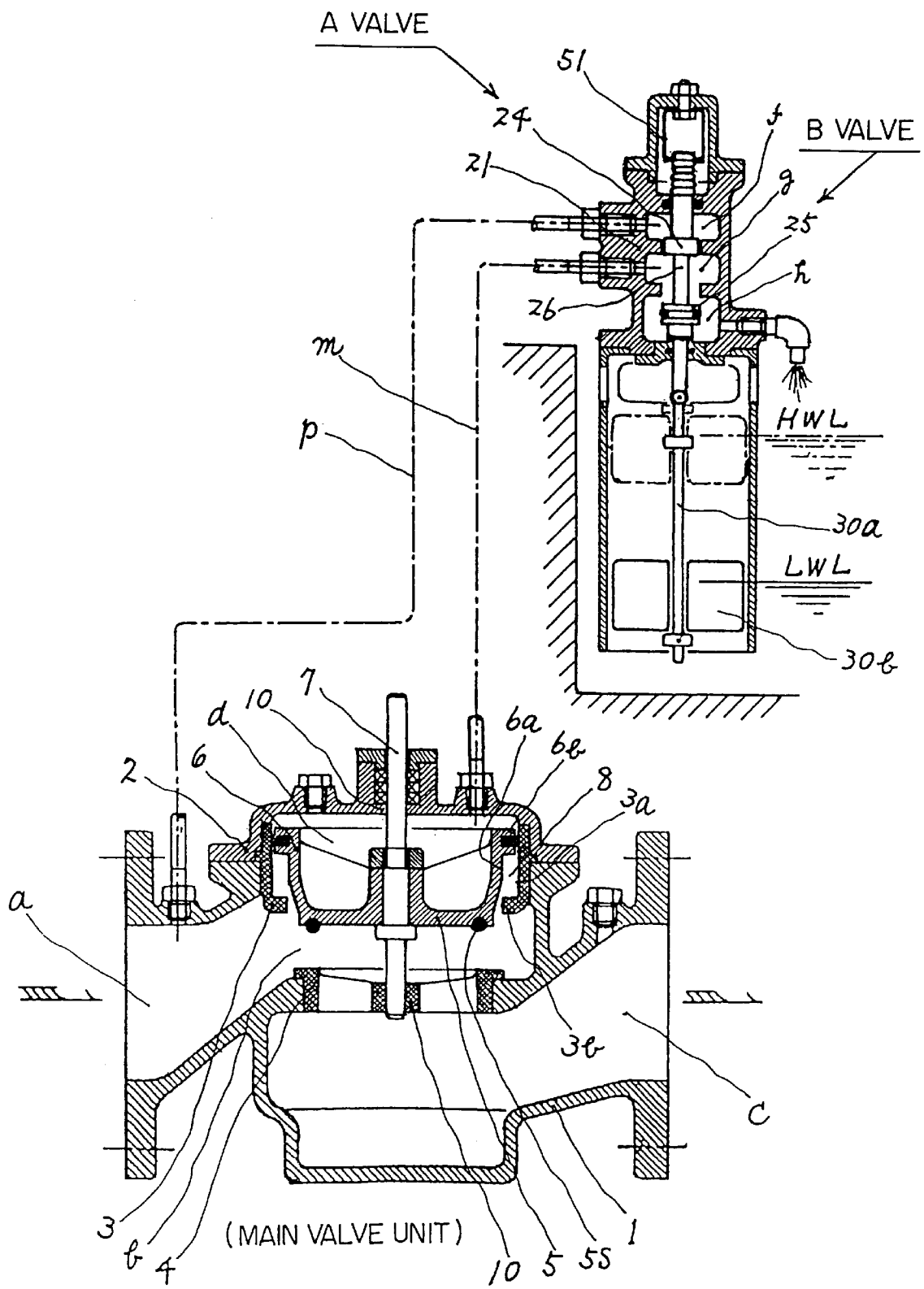
FIG. 15 is a longitudinal sectional view of an automatic regulating valve apparatus in a fifteenth embodiment of the present invention most closely relating to an automatic regulating valve apparatus stated in claims 11 and 14.

A valve apparatus in a fifteenth embodiment according to the present invention shown in FIG. 15 employs the pilot valve unit of the thirteenth embodiment and the float valve structure of the ninth embodiment in combination to achieve the control of the liquid level between an upper limit liquid level and a lower limit liquid level by a simple arrangement.

As shown in FIG. 15, An A valve which opens when a float 30b rises and closes when the float 30b falls, and a B valve which closes when the float 30b rises and opens when the float 30b falls are arranged in series and connected between the upstream and the downstream side of a main valve unit by connecting passages with a chamber between the A valve and the B valve connected to the main valve driving pressure chamber d.

The float 30b is supported for movement along a float shaft 30a connected to a spool 26 included in the pilot valve unit between stoppers attached to the float shaft 30a at positions near the upper end and near the lower end of the float shaft 30a. A braking device 51 exerts a fixed resistance against the movement of the float shaft 30a to prevent the movement of the float shaft 30a by a frictional dragging action of the float 30b sliding along the float shaft 30a according to the variation of the liquid level between the upper and the lower limit liquid level, and the resultant faulty operation of the pilot valve unit.

When the liquid level falls to the predetermined lower limit liquid level, the float 30b comes into contact with the stopper attached to the float shaft 30a at the position near the lower end of the float shaft 30a and depresses the stopper. Then, an A valve element 24 included in the A valve is moved to its closed position, and a B valve element 25 included in the B valve is moved to its open position. Consequently, the pressure in a main valve driving pressure chamber d decreases toward the secondary pressure, and a main valve element 5 is moved to its open position to start supplying the liquid through the main valve unit.

When the liquid level rises to the predetermined upper limit liquid level, the float 30b comes into contact with the stopper attached to the float shaft 30a at the position near the upper end of the float shaft 30a and pushes up the stopper. Then, the A valve element 24 is moved to its open position, and the B valve element 25 is moved to its closed position. Consequently, the pressure in a main valve driving pressure chamber d increases toward the primary pressure, and the main valve element 5 is moved to its closed position. In this state, a sealing member 5s attached to the main valve element 5 and a sealing member attached to the B valve element 25 form sealed joints.

Thus, the valve apparatus does not have any constant-flow control function and is capable of only controlling the liquid level between the predetermined upper and the predetermined lower limit liquid level.

In the valve apparatus shown in FIG. 15, the float shaft 30a is connected to the spool 26 in a coaxial arrangement. The float shaft 30a and the spool 26 may be connected by a mechanism for changing directions of motions or a linkage capable of multiplying force. The float 30b need not necessarily be placed below the pilot valve unit. The liquid level can be controlled with respect to a single reference liquid level if the float 30b is fixed to the float shaft 30a.

The valve apparatus shown in FIG. 15 is provided with a damping mechanism 8 (damper) including a main valve driving member 6 to make the main valve unit operate slowly for opening and closing operations.

The damping mechanism 8 comprises a cylindrical wall 3 disposed in a main valve casing 1 and having a cylindrical part 3a and a reduced cylindrical part 3b coaxial with the piston part 3a, and the main valve driving member 6 having a piston part 6a and an expanded piston part 6b coaxial with the piston part 6a. When the main valve driving member 6 is in a predetermined section (a section in which a main valve element 5 is close to a main valve seat 4) in the range of movement of the main valve driving member 6, the expanded piston part 6b is in sliding contact with the cylindrical part 3a, and the piston part 6a is in sliding contact with the reduced cylindrical part 3b to form a damping chamber 8 for dampening the motion of the main valve driving member 6. Timing of starting a dampening operation and damping force can be determined by properly designing the shape of the space formed between the cylindrical wall 3 and the main valve driving member 6 or by forming a small hole connecting the damping chamber 8 to an external space and capable of restricting the flow of the liquid.

The valve apparatus in the fifteenth embodiment is similar in other respects, functions and effects to that in the thirteenth embodiment and hence further description thereof will be omitted.

Figure 16:
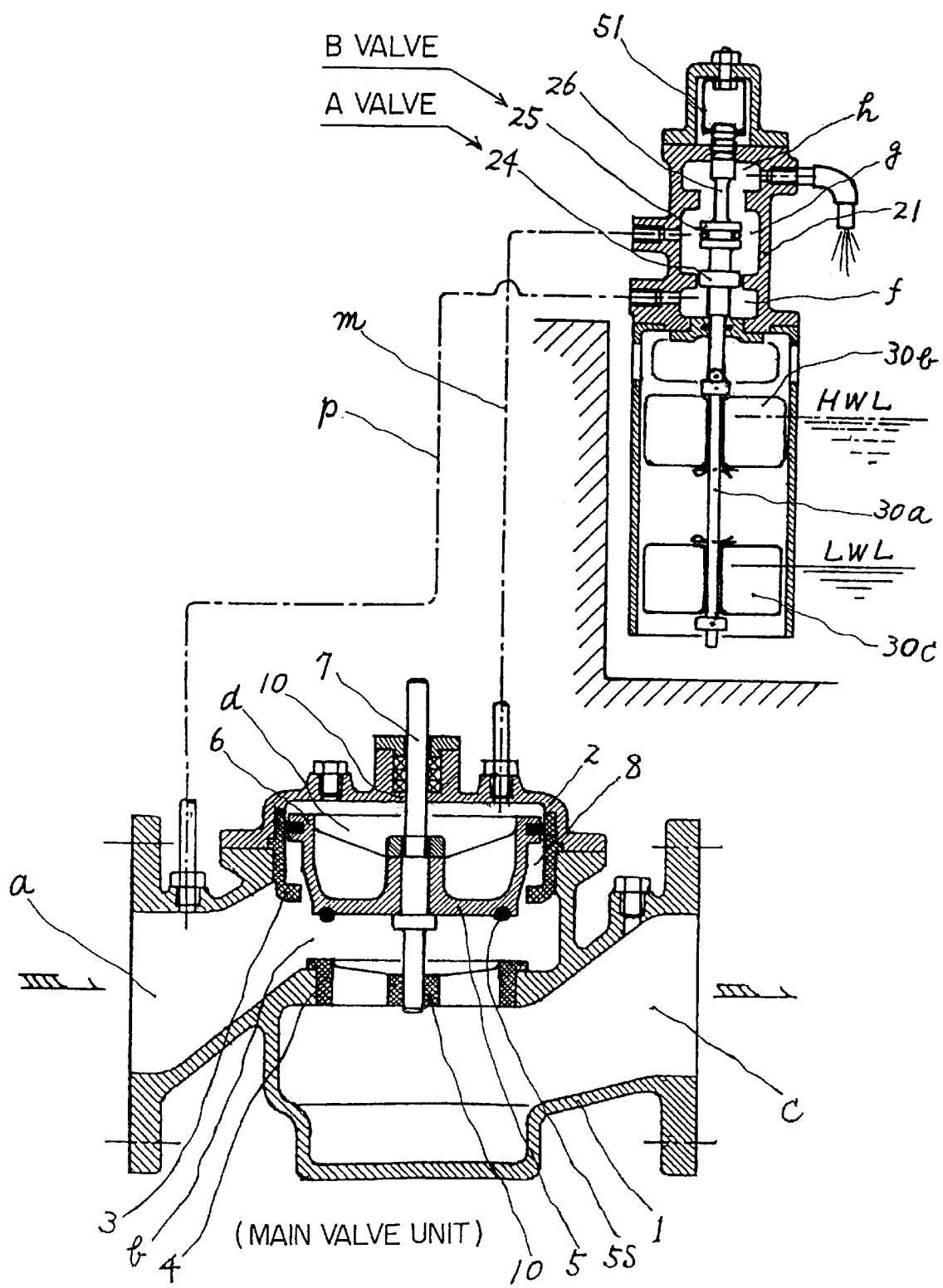
FIG. 16 is a longitudinal sectional view of an automatic regulating valve apparatus in a sixteenth embodiment of the present invention most closely relating to an automatic regulating valve apparatus stated in claims 11 and 14.

A valve apparatus in a sixteenth embodiment of the present invention shown in FIG. 16 is similar to the valve apparatus in the fifteenth embodiment and is provided with a pilot valve unit different from that of the valve apparatus in the fifteenth embodiment. As shown in FIG. 16, an A valve element 24 and a B valve element 25 are placed in an intermediate chamber g, two floats 30b and 30c are fixed to a float shaft 30a at a predetermined upper position and a predetermined lower position, respectively, instead of the float 30b employed in the fifteenth embodiment and mounted on the float shaft 30a for movement between the stoppers.

When the liquid level falls to a predetermined lower limit liquid level, the sum of the respective weights of the two floats 30b and 30c exceeds a buoyancy exerted on the float 30c and, consequently, the float shaft 30a moves downward. When the liquid level rises to a predetermined upper limit liquid level, the sum of buoyancies exerted on the two floats 30b and 30c exceeds the sum of the respective weights of the two floats 30b and 30c and, consequently, the float shaft 30a moves upward. While the liquid level is in a range between the upper and the lower limit liquid level, a braking device 51 exerting resistance against the movement of the float shaft 30a keeps the float shaft 30a stationary. Thus, the functions of the floats 30b and 30c are the same as those of the float 30b of the fifteenth embodiment.

The valve apparatus in the sixteenth embodiment is similar in other respects, functions and effects to that in the fifteenth embodiment and hence further description thereof will be omitted.

Figure 17:
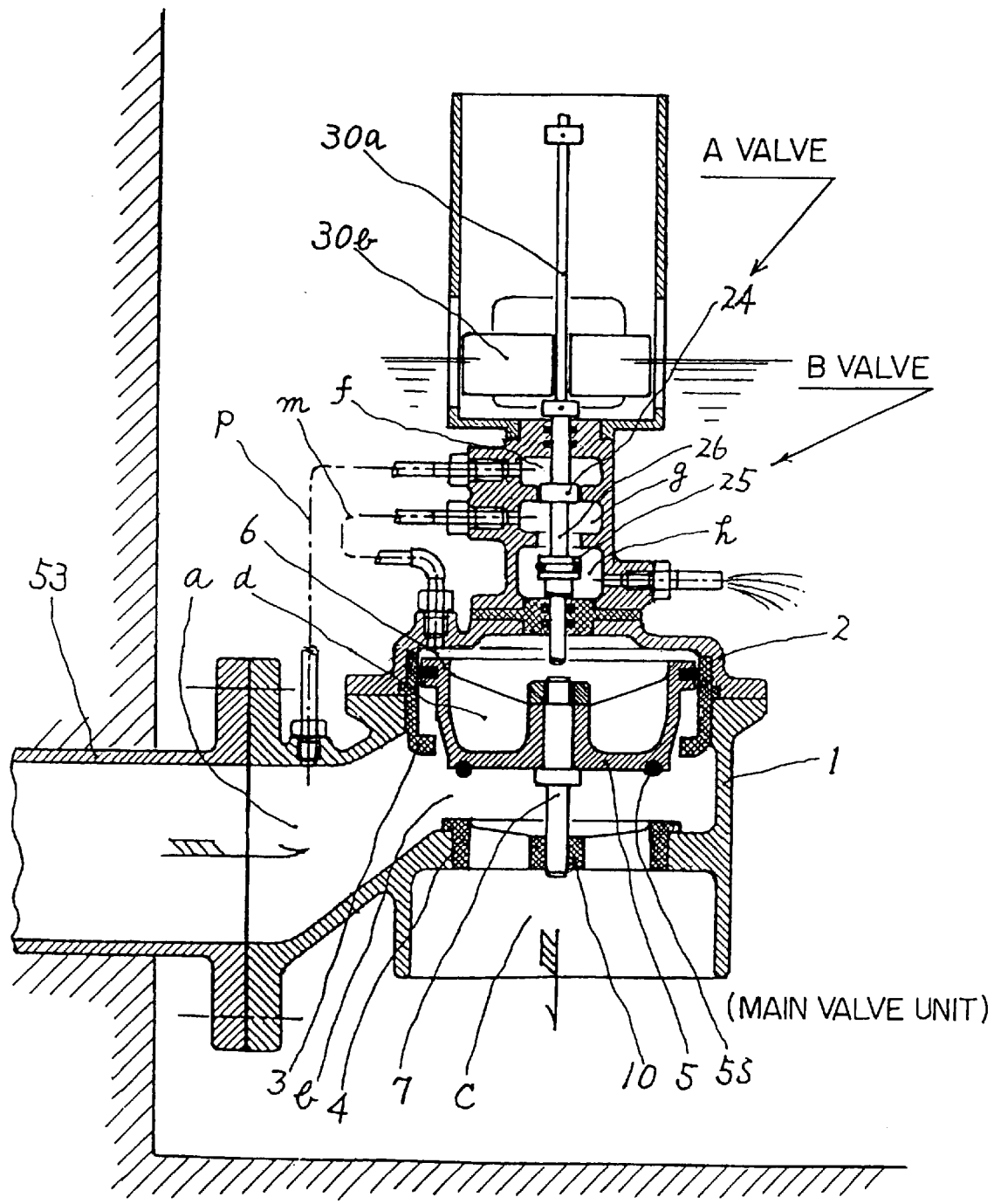
FIG. 17 is a longitudinal sectional view of an automatic regulating valve apparatus in a seventeenth embodiment of the present invention most closely relating to an automatic regulating valve apparatus stated in claims 11 and 14.

A valve apparatus in a seventeenth embodiment of the present invention shown in FIG. 17 is a compact discharge valve formed by uniting together the pilot valve unit and the main valve unit of the valve apparatus in the fifteenth embodiment with the float 30b disposed above the pilot valve unit. The valve apparatus has a main valve casing 1 having an open outlet end through which the liquid is discharged, and an inlet end joined to a conduit 53. The valve apparatus in the seventeenth embodiment is similar in other respects, functions and effects to that in the fifteenth embodiment and hence further description thereof will be omitted.

Figure 18:
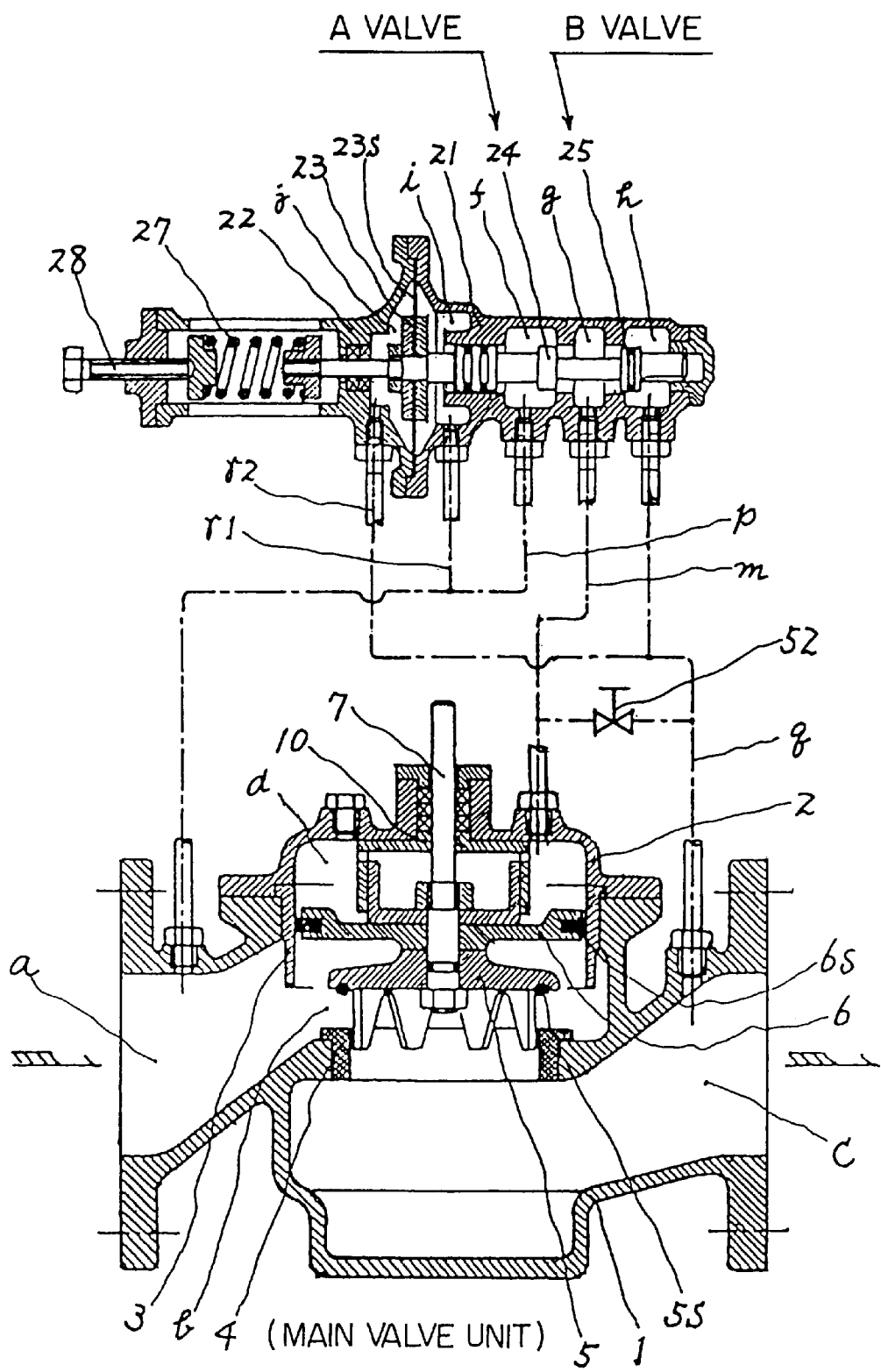
FIG. 18 is a longitudinal sectional view of an automatic regulating valve apparatus in an eighteenth embodiment of the present invention most closely relating to an automatic regulating valve apparatus stated in claim 12.

A valve apparatus in an eighteenth embodiment of the present invention shown in FIG. 18 is an emergency shutoff valve formed by removing the float valves and the associated parts from the valve apparatus in the thirteenth embodiment.

An A valve which opens when the pressure difference across a main valve unit rises above a predetermined level and closes when the same falls below the predetermined level, and a B valve which closes when the pressure difference across the main valve unit rises above the predetermined level and opens when the same falls below the predetermined level are arranged in series and connected between the upstream and the downstream side of the main valve unit by connecting passages with a chamber between the A valve and the B valve connected to the main valve driving pressure chamber d. A primary pressure chamber i and a secondary pressure chamber j formed on the opposite sides of a pilot pressure receiving plate 23 are connected to an inlet passage a and an outlet passage c, respectively. The A valve and the B valve opens and closes according to the variation of the pressure difference across the main valve unit. If pressure drops abnormally or flow rate increases abnormally due to the occurrence of an abnormal condition, such as the breakage of the conduit on the downstream side of the main valve unit, an emergency conduit shutoff operation is executed.

A valve 52 interposed between connecting passages m and q is used as a trigger for opening the main valve unit to resume the supply of the liquid after the arrangement on the downstream side of the main valve unit has been restored to its normal condition after the emergency conduit shutoff operation. After the supply of the liquid has been resumed, the valve 52 is kept closed. The valve 52 may manually be operated, may be a solenoid valve or a motor-driven valve, or may be operated in a remote control mode by using an actuator.

The pressure in the main valve driving pressure chamber d becomes equal to the secondary pressure when the valve 52 is opened and, consequently, the main valve element 5 is moved away from the valve seat 4 and the liquid starts flowing through the main valve unit. Then, the valve 52 is closed. The pressure difference between the primary pressure chamber i and the secondary pressure chamber j, i.e., the pressure difference across the main valve unit, is small and the force of the spring 27 exceeds a force corresponding to the pressure difference while the liquid is being supplied, the A valve element 24 is at its closed position and the B valve element 25 is at its open position in the pilot valve unit.

If the actual flow rate increases beyond a predetermined value due to the breakage of the downstream conduit caused by a disaster or the excessive consumption of the liquid, resistance exerted on the flow of the liquid by a main valve opening b increases and the pressure difference between the primary pressure chamber i and the secondary pressure chamber j increase. Consequently, a force corresponding to the pressure difference exceeds the force of the spring 27, the A valve element 24 is moved to its open position, the B valve element 25 is moved to its closed position, the pressure in the main valve driving pressure chamber d rises toward the primary pressure, the main valve element 5 is brought into contact with the main valve seat 4, and a sealing member 5s attached to the main valve element 5 and a sealing member attached to the B valve element 25 form sealed joints.

When it is desired to resume the supply of the liquid after restoring the arrangement on the downstream side of the main valve unit to its normal condition, the valve 52 is opened to resume the supply of the liquid by the foregoing process, and the valve 52 is closed after the supply of the liquid has been resumed. Thus, the valve apparatus serves as an emergency shutoff valve apparatus.

The valve 52 may be interposed between the inlet passage a and the outlet passage c instead of between the connecting passages m and q. However, if the valve 52 is interposed between the inlet passage a and the outlet passage c, the valve 52 must be of a bore size greater than that of the valve 52 interposed between the connecting passages m and q. The main valve unit can be forcibly closed by closing the connecting passage q. Therefore, if the main valve unit needs to be closed forcibly, a valve may be placed in the connecting passage q at a position near the outlet passage c and the valve may be closed when necessary.

The valve apparatus in the eighteenth embodiment is similar in other respects, functions and effects to that in the thirteenth embodiment and hence further description thereof will be omitted.

Figure 19:
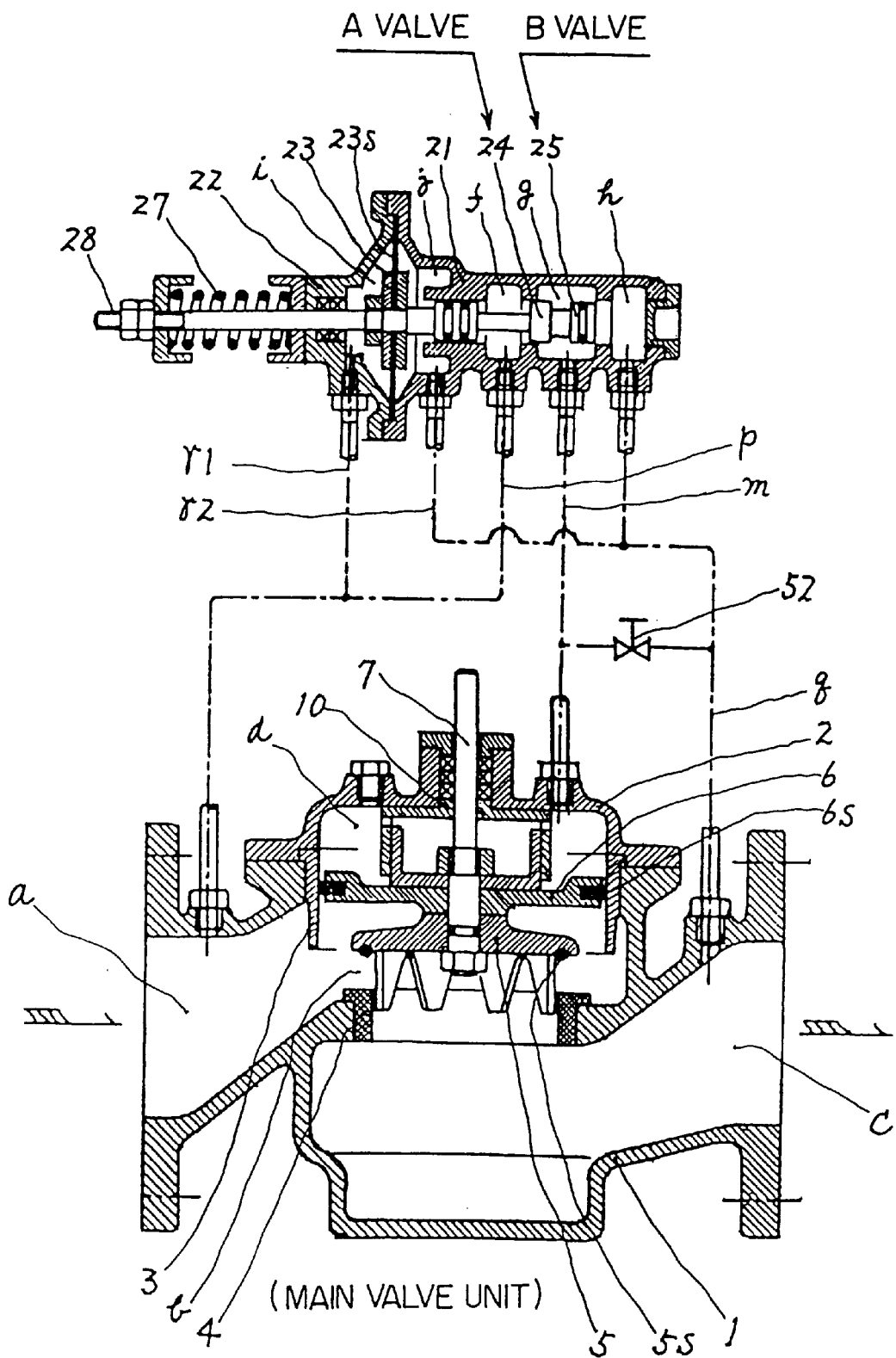
FIG. 19 is a longitudinal sectional view of an automatic regulating valve apparatus in a nineteenth embodiment of the present invention most closely relating to an automatic regulating valve apparatus stated in claim 12.

A valve apparatus in a nineteenth embodiment of the present invention shown in FIG. 19 is similar to the valve apparatus in the eighteenth embodiment and is provided with a pilot valve unit different from that of the valve apparatus in the eighteenth embodiment. As shown in FIG. 19, an A valve element 24 and a B valve element 25 are placed in an intermediate chamber g, and a spring 27 exerts a force in a direction opposite to the direction in which the spring 27 of the eighteenth embodiment exerts its force for the same function. Although the arrangement of connecting passages in the nineteenth embodiment is somewhat different from that of the corresponding connecting passages in the eighteenth embodiment because the valve apparatus in the nineteenth embodiment is a modification of the valve apparatus in the eighteenth embodiment, the valve apparatus in the nineteenth embodiment is similar in other respects, functions and effects to that in the eighteenth embodiment and hence further description thereof will be omitted.

Figure 20:
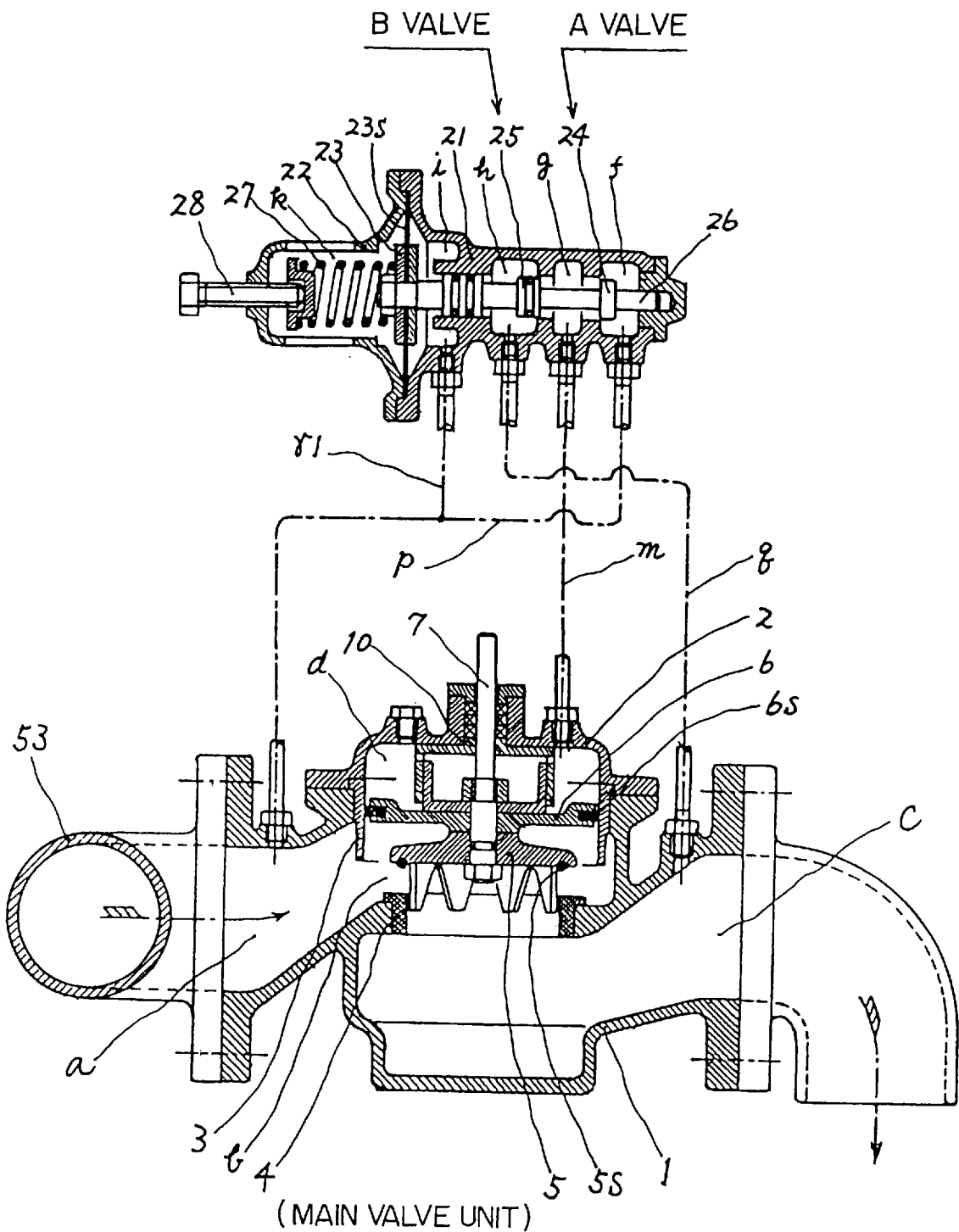
FIG. 20 is a longitudinal sectional view of an automatic regulating valve apparatus in a twentieth embodiment of the present invention most closely relating to an automatic regulating valve apparatus stated in claim 13.

A valve apparatus in a twentieth embodiment of the present invention shown in FIG. 20 is a safety valve apparatus.

An A valve which closes when the pressure on the upstream side of a main valve unit (primary pressure) rises above a predetermined level and opens when the same drops below the predetermined level, and a B valve which opens when the pressure on the upstream side of the main valve unit (primary pressure) rises above the predetermined level and closes when the same drops below the predetermined level are arranged in series and connected between the upstream and the downstream side of the main valve unit by connecting passages with a chamber between the A valve and the B valve connected to a main valve driving pressure chamber d. A primary pressure chamber i and a spring chamber k are formed on the opposite sides of a pilot pressure receiving plate 23, the primary pressure chamber i is connected to an inlet passage a, and the spring chamber k is opened to the atmosphere. The A valve and the B valve are opened and closed according to the variation of the primary pressure. If the primary pressure rises abnormally, the valve apparatus is fully opened to suppress pressure rise.

The valve apparatus is connected to a branch pipe branched from a conduit 53 for conducting a flow of a liquid. A force exerted by a spring 27 exceeds a force corresponding to the pressure in the primary pressure chamber i while the primary pressure is lower than a predetermined level. Consequently, an A valve element 24 included in the A valve is at its open position and a B valve element 25 included in the B valve is at its closed position, the pressure in a main valve driving pressure chamber d is equal to the primary pressure, a main valve element 5 is at its closed position, and a sealing member 5s attached to the main valve element 5 and a sealing member attached to the B valve element 25 form sealed joints.

When the primary pressure rises above the predetermined level, the pressure in the primary pressure chamber i rises, the force corresponding to the pressure in the primary pressure chamber i exceeds the force of the spring 27. Consequently, the A valve element 24 is moved to its closed position, the B valve element 25 is moved to its open position, and the pressure in the main valve driving pressure chamber d decreases toward the secondary pressure. Therefore, the main valve element 5 is moved to its open position to discharge the liquid, so that the rise of the primary pressure is suppressed. Thus, the valve apparatus serves as a safety valve.

If the main valve unit needs to be opened forcibly for open discharging, a valve may be interposed between connecting passages m and q or between an inlet passage a and an outlet passage c, and the valve may be opened.

Figure 21:
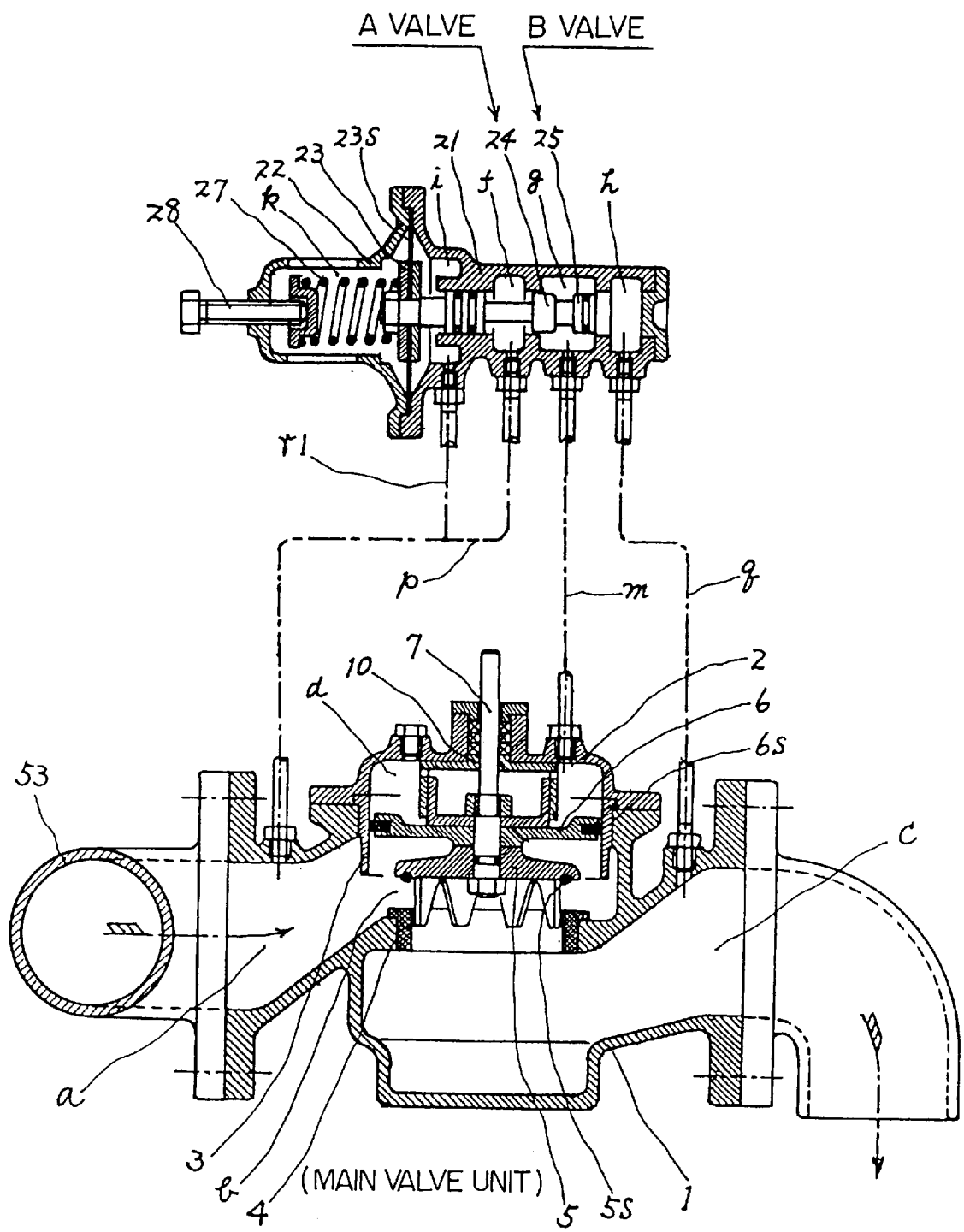
FIG. 21 is a longitudinal sectional view of an automatic regulating valve apparatus in a twenty-first embodiment of the present invention most closely relating to an automatic regulating valve apparatus stated in claim 13.

A valve apparatus in a twenty-first embodiment of the present invention shown in FIG. 21 is similar to the valve apparatus in the twentieth embodiment and is provided with a pilot valve unit different from that of the valve apparatus in the twentieth embodiment. As shown in FIG. 21, an A valve element 24 and a B valve element 25 are placed in an intermediate chamber g. Although the arrangement of connecting passages in the twenty-first embodiment is somewhat different from that of the corresponding connecting passages in the twentieth embodiment because the valve apparatus in the twenty-first embodiment is a modification of the valve apparatus in the twentieth embodiment, the valve apparatus in the twenty-first embodiment is similar in other respects, functions and effects to that in the twentieth embodiment and hence further description thereof will be omitted.

Figure 22:
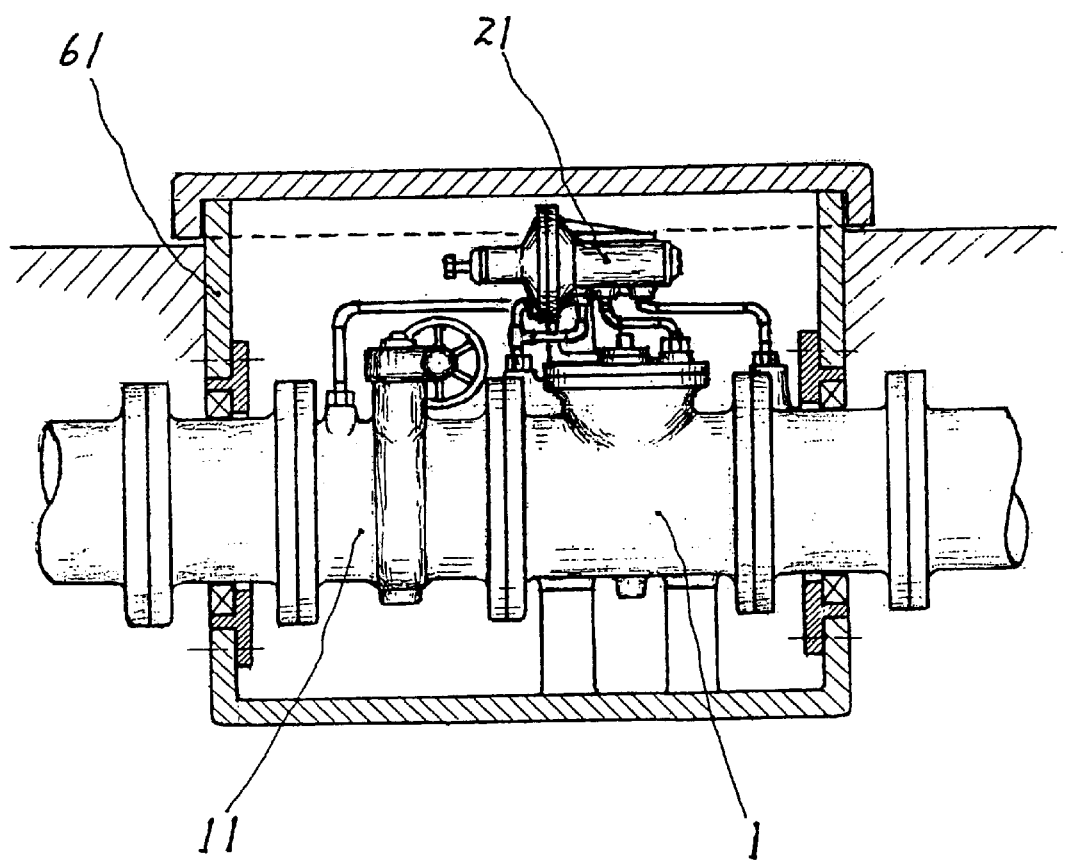
FIG. 22 is a longitudinal sectional view (partly in a front elevation) of an automatic regulating valve apparatus in a twenty-second embodiment of the present invention most closely relating to an automatic regulating valve apparatus stated in claim 15.
Figure 23:
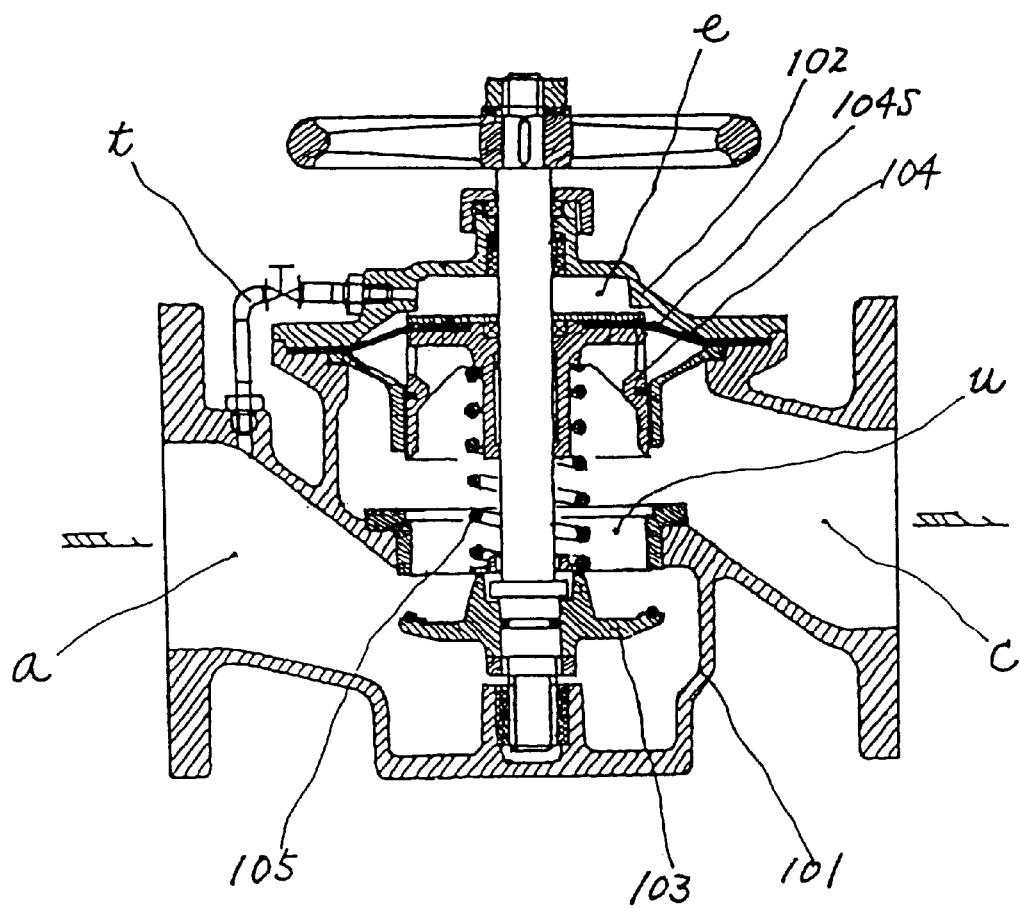
FIG. 23 is a longitudinal sectional view of a prior art direct-acting constant-flow valve.
Figure 24:
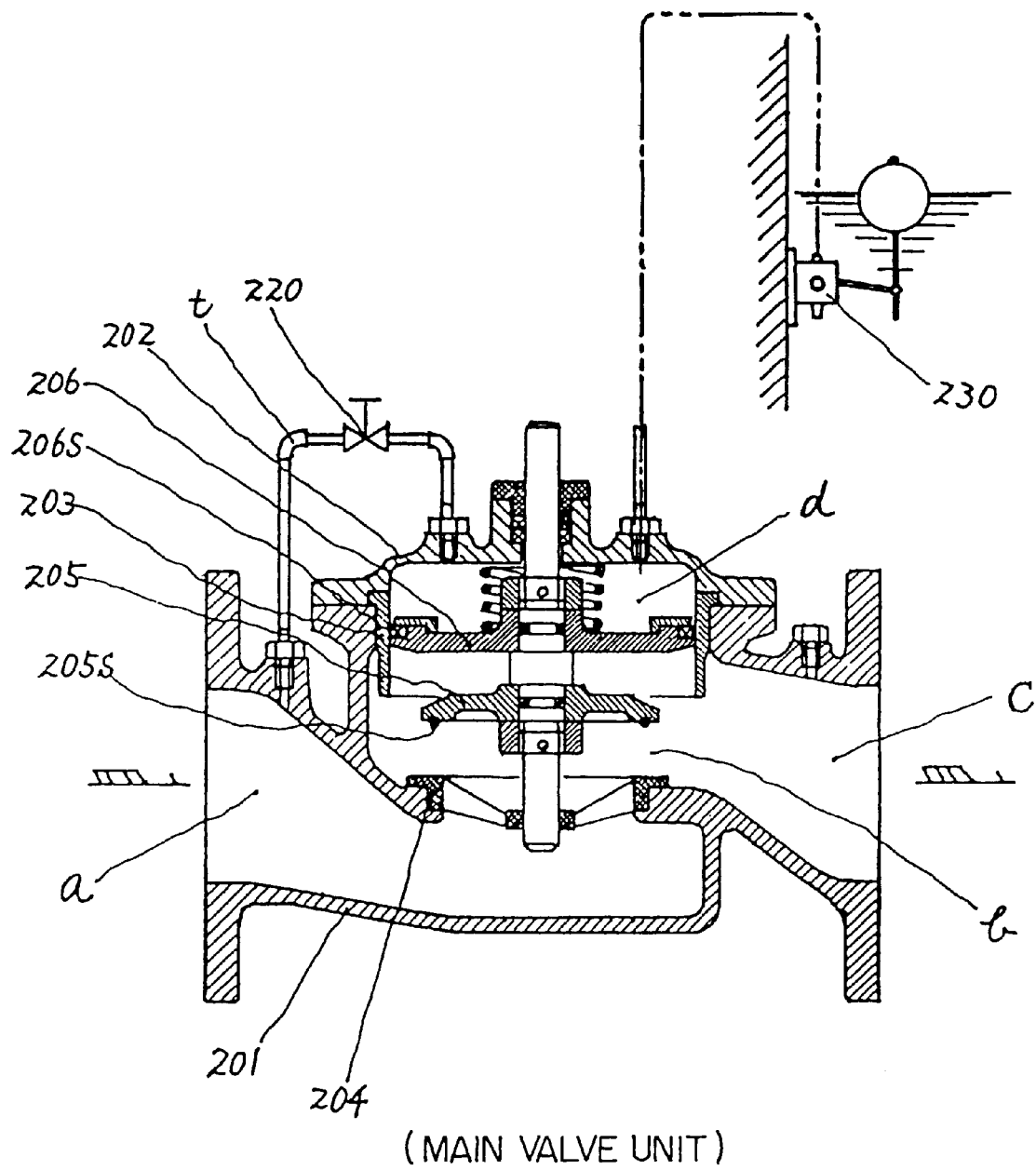
FIG. 24 is a longitudinal sectional view of a prior art pilot-operated liquid level control valve.

A valve apparatus in a twenty-second embodiment of the present invention shown in FIG. 22 is formed by containing any one of the valve apparatuses in the foregoing embodiments in a case 61. A valve apparatus shown in FIG. 22 employs the valve apparatus in the first embodiment by way of example. Any one of the valve apparatuses in the foregoing embodiments may be employed. The case 61 is provided with flanges or threaded openings to be connected to external conduits. The valve apparatus can easily be installed in the ground without requiring work for forming a pit, which saves time and costs of construction work. The case 61 may be of any suitable shape and of any suitable material; the case 61 may be a rectangular box or a cylindrical box and may be made of a steel, concrete, an FRP or a reinforced plastic material.

Technical features common to the foregoing embodiments will be described below.

In the pilot valve units of all the embodiments, the A valve element 24 and the B valve element 25 are formed integrally with the spool and move together, the primary pressure and the secondary pressure is combined in the pilot valve unit to produce a combined pressure, the combined pressure is applied to the main valve driving pressure chamber d to respond quickly to the variation of the condition of flow. The valve apparatus operates quickly. Since the valve elements 24 and 25 are formed and arranged so as to create a state where one of the valve elements 24 and 25 is at its open position while the other is at its closed position, and a state where both the valve elements 24 and 25 are substantially at their closed positions when the flow is stable, chattering and hunting scarcely occur. As mentioned in the description of some of the embodiments, both the valve elements 24 and 25 can be placed in the intermediate chamber g. The valve elements 24 and 25 may be formed with separate spools, respectively. The disposition (positional relation) and the combination of the chambers f, g, h, i, j, k, v and w, and the arrangement of the connecting passages may be changed within the scope of the present invention, and the construction of the pilot valve unit is not limited to those of the pilot valve units employed in the embodiments specifically described herein.

The fixed-pressure applying means included in the pilot valve unit may be an elastic member other than the spring employed in the foregoing embodiments, a combination of a weight and a linkage, a mechanism capable of multiplying force, a pneumatic mechanism or a hydraulic mechanism.

Although the main valve unit provided with the main valve element 5 employed in each of the foregoing embodiments is a lift valve, the main valve unit may be a valve unit other than the lift valve, such as a butterfly valve, a gate valve, a ball valve or such. As mentioned in the description of some of the embodiments, the main valve element 5 may be formed integrally with the main valve driving member 6. In the foregoing embodiments, the main passage extending through the inlet passage a→ the main valve opening b→ the outlet passage c, and the main valve driving pressure chamber d are formed in the main valve casing 1 to form the main valve unit in a simple construction. However, the main passage and the main valve driving pressure chamber d may be formed in two separate valve casings, respectively, and the main valve element 5 and the main valve driving member 6 may be fixed to the opposite end parts of a main valve stem extending through the two valve casings.

Some cases require that the main valve unit operates gradually to prevent the influence of pressure pulsation resulting from the variation of flow, such as chattering and hunting. Such a requirement may be met by forming the main valve opening b in a saw-toothed shape to make flow rate vary smoothly, by providing the main valve unit with a damping device 8 (damper) comprising a cylinder and a piston or by providing the main valve driving member 6 with a damping device 8 (damper). The pilot valve unit may be provided with a damping device or some of the connecting passages may be provided with a restrictor. Those damping means for making the main valve unit operate gradually may be used individually or some of those damping means may be used in combination or the valve apparatus need not be provided with any one of those damping means when unnecessary.

The variable restrictor (or the orifice) 11 for constant-flow control function may be a generally known valve, such as a butterfly valve, a gate valve, a ball valve or a lift valve. The restrictor 11 may be manually operated or may be operated automatically by a suitable actuator. As mentioned in the description of some of the embodiments the restrictor (or the orifice) 11 may be disposed on either the upstream side or the downstream side of the main valve unit. When an adjusting device (adjusting screw 28) is combined with the fixed-pressure applying means (spring 27) of the pilot valve unit, a flow rate setting operation by using the restrictor (orifice) 11 is not necessarily necessary because a desired flow rate can be set by adjusting the fixed-pressure applying means, and hence the fixed orifice plate 11 may be used instead of the variable restrictor 11. Needless to say, it is desirable that the fixed orifice plate is replaceable.

The float valves 30, 36 and 37 for a liquid level control function may be any suitable well-known valves including ball taps. Valves operated by a liquid level sensor may be used instead of the float valves. Each of the float valves 30, 36 and 37 may be placed at the free end part of the connecting passage to discharge the liquid into the downstream side of the main valve unit or may be placed as middle part of the connecting passage depending on the condition of the site where the valve apparatus is installed.

The sealing members mounted on the component parts required to form a sealed joint may be O rings, sealing rings, a diaphragm, a bellows or such. If those component members are able to form a satisfactory sealed joint by directly coming into contact with the corresponding component member, the sealing member may be omitted. Naturally, comblike projections or a honeycomb structure may be formed in a parts of the valve apparatus through which rapid currents are expected to flow to prevent cavitation or the like.

There is no particular restriction on the application of conventional techniques to the component members of the valve apparatus in accordance with the present invention. Various changes and variations may be made in the foregoing embodiments without departing from the scope of the invention and the present invention is not limited in practical application to the embodiments specifically described herein.

Industrial Applicability

The automatic regulating valve apparatus in accordance with the present invention provided with the pilot valve unit based on a novel technical idea is capable of being easily formed in large size or high-pressure type, which has been difficult in the conventional direct-acting automatic regulating valve apparatus. The automatic regulating valve apparatus in accordance with the present invention is capable of exercising excellent automatic control functions including a constant-flow control function, an emergency shutoff function, a liquid level control function and an upstream pressure control function, has a perfect sealing function. Since the pilot valve unit is not provided with any fixed restricting passage, such as a needle valve, and capable of exercising a clogging preventing function achieved by self-cleaning operation, the automatic regulating valve apparatus is maintenance-free. Although the automatic regulating valve apparatus operates quickly, chattering and hunting rarely occur. The main valve unit and the pilot valve unit of the automatic regulating valve apparatus are simple in construction and easily adjustable. The automatic regulating valve apparatus does not have any component parts which are difficult to design, manufacture, operate, maintain and manage, and hence the automatic regulating valve apparatus is highly reliable and economically effective.

What is claimed is:

1. An automatic regulating valve apparatus comprising: a main valve unit and a pilot valve unit operatively connected to the main valve unit to control the main valve unit, wherein the main valve unit comprises a main valve casing, a main valve element disposed in the main valve casing, and a main valve driving member disposed in the main valve casing together with the main valve element and having a pressure receiving area greater than that of the main valve element, the main valve element is disposed on an upstream side of a valve seat so as to form a restricting passage between the main valve element and the main valve seat, the main valve driving member is disposed for sliding movement in a space defined by a cylindrical wall formed in the main valve casing so as to define a main valve driving pressure chamber together with the cylindrical wall, a restrictor is disposed in a passage extending through the main valve unit;

the pilot valve unit comprises a pilot valve A and a pilot valve B which are operated by a balance of counteracting forces respectively produced by a pressure difference across the restrictor and a fixed-pressure applying member, the pilot valve A opens when the pressure difference across the restrictor rises above a predetermined level and closes when the same drops below the predetermined level, the pilot valve B closes when the pressure difference across the restrictor rises above the predetermined level and opens when the same drops below the predetermined level; and the pilot valve A and the pilot valve B are arranged in series and connected between the upstream and the downstream side of the main valve unit by connecting passages with a chamber between the pilot valves A and B connected to the main valve driving pressure chamber; and wherein a valve element is further provided, said valve element being capable of closing when liquid level on the downstream side of the main valve unit rises above a predetermined level and of opening when the same falls below the predetermined level, and placed in series in a connecting passage connected to the pilot valve B.

2. The automatic regulating valve apparatus according to claim 1, wherein the restrictor is of a variable type.

3. An automatic regulating valve apparatus comprising: a main valve unit and a pilot valve unit operatively connected to the main valve unit to control the main valve unit, wherein the main valve unit comprises a main valve casing, a main valve element disposed in the main valve casing, and a main valve driving member disposed in the main valve casing together with the main valve element and having a pressure receiving area greater than that of the main valve element, the main valve element is disposed on an upstream side of a valve seat so as to form a restricting passage between the main valve element and the main valve seat, the main valve driving member is disposed for sliding movement in a space defined by a cylindrical wall formed in the main valve casing so as to define a main valve driving pressure chamber together with the cylindrical wall, a restrictor is disposed in a passage extending through the main valve unit;

the pilot valve unit comprises a pilot valve A and a pilot valve B which are operated by a balance of counteracting forces respectively produced by a pressure difference across the restrictor and a fixed-pressure applying member, the pilot valve A opens when the pressure difference across the restrictor rises above a predetermined level and closes when the same drops below the predetermined level, the pilot valve B closes when the pressure difference across the restrictor rises above the predetermined level and opens when the same drops below the predetermined level; and the pilot valve A and the pilot valve B are arranged in series and connected between the upstream and the downstream side of the main valve unit by connecting passages with a chamber between the pilot valves A and B connected to the main valve driving pressure chamber; and wherein a valve element is further provided, said valve element being capable of closing when liquid level on the downstream side of the main valve unit rises above a predetermined upper limit and of opening when the same falls below the predetermined lower limit, and placed in series in a connecting passage connected to the pilot valve B.

4. An automatic regulating valve apparatus comprising: a main valve unit and a pilot valve unit operatively connected to the main valve unit to control the main valve unit, wherein the main valve unit comprises a main valve casing, a main valve element disposed in the main valve casing, and a main valve driving member disposed in the main valve casing together with the main valve element and having a pressure receiving area greater than that of the main valve element, the main valve element is disposed on an upstream side of a valve seat so as to form a restricting passage between the main valve element and the main valve seat, the main valve driving member is disposed for sliding movement in a space defined by a cylindrical wall formed in the main valve casing so as to define a main valve driving pressure chamber together with the cylindrical wall, a restrictor is disposed in a passage extending through the main valve unit;

the pilot valve unit comprises a pilot valve A and a pilot valve B which are operated by a balance of counteracting forces respectively produced by a pressure difference across the restrictor and a fixed-pressure applying member, the pilot valve A opens when the pressure difference across the restrictor rises above a predetermined level and closes when the same drops below the predetermined level, the pilot valve B closes when the pressure difference across the restrictor rises above the predetermined level and opens when the same drops below the predetermined level; and the pilot valve A and the pilot valve B are arranged in series and connected between the upstream and the downstream side of the main valve unit by connecting passages with a chamber between the pilot valves A and B connected to the main valve driving pressure chamber; and wherein a pilot valve C is further provided, said valve C being operated by a balance of counteracting forces respectively produced by a pressure difference across the main valve unit and a fixed pressure applying element, capable of closing when the pressure difference across the main valve unit rises above a predetermined level and of opening when the same drops below the predetermined level;

a first float valve capable of closing when liquid level on the downstream side of the main valve unit rises above a predetermined upper limit and of opening when the same drops below the predetermined upper limit; and a second float valve capable of closing when the liquid level on the downstream side of the main valve unit rises above a predetermined lower limit and of opening when the same drops below the lower limit; and wherein the pilot valve C and the first float valve are placed in series in a connecting passage connected to the pilot valve B, and the main valve driving pressure chamber is connected through the second float valve to the downstream side of the main valve unit.

5. An automatic regulating valve apparatus comprising: a main valve unit and a pilot valve unit operatively connected to the main valve unit to control the main valve unit, wherein the main valve unit comprises a main valve casing, a main valve element disposed in the main valve casing, and a main valve driving member disposed in the main valve casing together with the main valve element and having a pressure receiving area greater than that of the main valve element, the main valve element is disposed on an upstream side of a valve seat so as to form a restricting passage between the main valve element and the main valve seat, the main valve driving member is disposed for sliding movement in a space defined by a cylindrical wall formed in the main valve casing so as to define a main valve driving pressure chamber together with the cylindrical wall, a restrictor is disposed in a passage extending through the main valve unit;

the pilot valve unit comprises a pilot valve A and a pilot valve B which are operated by a balance of counteracting forces respectively produced by a pressure difference across the restrictor and a fixed-pressure applying member, the pilot valve A opens when the pressure difference across the restrictor rises above a predetermined level and closes when the same drops below the predetermined level, the pilot valve B closes when the pressure difference across the restrictor rises above the predetermined level and opens when the same drops below the predetermined level; and the pilot valve A and the pilot valve B are arranged in series and connected between the upstream and the downstream side of the main valve unit by connecting passages with a chamber between the pilot valves A and B connected to the main valve driving pressure chamber; and wherein a pilot valve D is further provided, said valve D being operated by a balance of counteracting forces respectively produced by a pressure difference across the restrictor and a fixed pressure applying element, capable of opening when the pressure difference across the restrictor rises above a predetermined level and of closing when the same drops below the predetermined level;

a first float valve capable of closing when liquid level on the downstream side of the main valve unit rises above a predetermined upper limit and of opening when the same drops below the predetermined upper limit; and a second float valve capable of closing when the liquid level on the downstream side of the main valve unit rises above a predetermined lower limit and of opening when the same drops below the lower limit;

wherein the pilot valve D and the first float valve are placed in series in a connecting passage connected to the pilot valve B, and the main valve driving pressure chamber is connected through the second float valve to the downstream side of the main valve unit.

6. The automatic regulating valve apparatus according to claim 5, wherein three valve elements of the pilot valves A, B and D are disposed coaxially so as to move together according to the balance of the counteracting forces produced by the pressure difference across the restrictor and the fixed-pressure applying means.

7. An automatic regulating valve apparatus comprising a main valve unit and a pilot valve unit operatively connected to the main valve unit to control the main valve unit;

wherein the main valve unit comprises a main valve casing, a main valve element disposed in the main valve casing, and a main valve driving member disposed in the main valve casing together with the main valve element and having a pressure receiving area greater than that of the main valve element, the main valve element is disposed on an upstream side of a valve seat so as to form a restricting passage between the main valve element and the main valve seat, the main valve driving member is disposed for sliding movement in a space defined by a cylindrical wall formed in the main valve casing so as to define a main valve driving pressure chamber together with the cylindrical wall;

the pilot valve unit comprises a pilot valve A and a pilot valve B operated by a balance of counteracting forces respectively produced by a pressure difference across the main valve unit and a fixed-pressure applying means, the pilot valve A is capable of opening when the pressure difference across the main valve unit rises above a predetermined level and of closing when the same drops below the predetermined level, the pilot valve B is capable of closing when the pressure difference across the main valve unit rises above the predetermined level and of opening when the same drops below the predetermined level, the pilot valves A and B are arranged in series and connected between the upstream and the downstream side of the main valve unit by connecting passages with a chamber between the pilot valves A and B connected to the main valve driving pressure chamber;

a first float valve capable of closing when liquid level on the downstream side of the main valve unit rises above a predetermined upper limit and of opening when the same drops below the predetermined upper limit, and a second float valve capable of closing when the liquid level on a downstream side of the main valve unit rises above a predetermined lower limit and of opening when the same drops below the lower limit are employed; and the first float valve is placed in series in a connecting passage, connected to the pilot valve B, and the main valve driving pressure chamber is connected through the second float valve to the downstream side of the main valve unit.

* * * * *

UNITED STATES PATENT AND TRADEMARK OFFICE
CERTIFICATE OF CORRECTION

PATENT NO. : 6,263,905 B1  Page 1 of 1
DATED : July 24, 2001
INVENTOR(S) : Hiroshi Yokota et al.

It is certified that error appears in the above-identified patent and that said Letters Patent is hereby corrected as shown below:

<u>Title page,</u>
Item [73], should read: -- [73] Assignee: Kabushiki Kaisha Yokota Seisakusho, Hiroshima-Ken (JP); Hiroshi Yokota, Hiroshima-Ken (JP); Shingo Yokota, Hiroshima-Ken (JP) --

Signed and Sealed this

Thirty-first Day of December, 2002

JAMES E. ROGAN
*Director of the United States Patent and Trademark Office*